(12) United States Patent
Slocum et al.

(10) Patent No.: US 10,488,079 B2
(45) Date of Patent: Nov. 26, 2019

(54) LOW COST PARABOLIC CYLINDRICAL TROUGH FOR CONCENTRATED SOLAR POWER

(71) Applicant: Massachusetts Institute of Technology, Cambridge, MA (US)

(72) Inventors: Alexander H. Slocum, Bow, NH (US); Ronald B. Campbell, Jr., Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/310,536

(22) PCT Filed: May 13, 2015

(86) PCT No.: PCT/US2015/030611
§ 371 (c)(1),
(2) Date: Nov. 11, 2016

(87) PCT Pub. No.: WO2015/175688
PCT Pub. Date: Nov. 19, 2015

(65) Prior Publication Data
US 2017/0082322 A1 Mar. 23, 2017

Related U.S. Application Data

(60) Provisional application No. 61/992,373, filed on May 13, 2014.

(51) Int. Cl.
*G02B 5/08* (2006.01)
*F24S 23/70* (2018.01)
(Continued)

(52) U.S. Cl.
CPC ............... *F24S 23/82* (2018.05); *F24S 23/71* (2018.05); *F24S 23/74* (2018.05); *F24S 25/13* (2018.05);
(Continued)

(58) Field of Classification Search
CPC . F24S 23/82; F24S 23/71; F24J 2/1057; F24J 2/12; F24J 2/14; F24J 2/5233;
(Continued)

(56) References Cited

U.S. PATENT DOCUMENTS 290,851 A  12/1883 Calver
2,694,357 A  11/1954 Lee
(Continued)

FOREIGN PATENT DOCUMENTS

CN  101105342 A  1/2008
CN  102298191 A  12/2011
(Continued)

OTHER PUBLICATIONS

International Search Report and Written Opinion of the International Searching Authority for PCT/US2012/053438, dated Jan. 24, 2013, 12 pages.
(Continued)

*Primary Examiner* — Euncha P Cherry
(74) *Attorney, Agent, or Firm* — Goodwin Procter LLP

(57) ABSTRACT

Reflectors for solar concentration and methods for formation thereof. A reflective assembly (1340) may include a plurality of elongate panels (370) forming a continuous trough (1330), and a frame (1230) configured to support the panels, with the frame with attached panels defining a parabolic contour on the top side of the trough.

26 Claims, 12 Drawing Sheets

(51) Int. Cl.
  *F24S 23/71* (2018.01)
  *F24S 23/74* (2018.01)
  *F24S 25/13* (2018.01)
  *B21B 5/00* (2006.01)
  *F24S 25/60* (2018.01)
  *F24S 25/00* (2018.01)

(52) U.S. Cl.
  CPC ........... *B21B 5/00* (2013.01); *F24S 2023/874* (2018.05); *F24S 2025/601* (2018.05); *F24S 2025/801* (2018.05); *Y02E 10/45* (2013.01); *Y02E 10/47* (2013.01)

(58) Field of Classification Search
  CPC ......... F24J 2002/1085; F24J 2002/4676; F24J 2002/5215; G02B 19/0042; B21B 5/00; Y02E 10/45; Y02E 10/47
  USPC .......................................................... 359/853
  See application file for complete search history.

(56) References Cited

U.S. PATENT DOCUMENTS

| | | | |
|---|---|---|---|
| 2,800,291 | A | 7/1957 | Veryan |
| 3,892,433 | A | 7/1975 | Blake |
| 4,026,112 | A | 5/1977 | Scragg et al. |
| 4,034,735 | A | 7/1977 | Waldrip |
| 4,040,411 | A | 8/1977 | Rust |
| 4,202,322 | A | 5/1980 | Delgado et al. |
| 4,390,008 | A | 6/1983 | Andrews |
| 4,401,103 | A | 8/1983 | Thompson |
| 4,408,459 | A | 10/1983 | Yogev |
| 4,408,595 | A | 10/1983 | Broyles et al. |
| 4,423,719 | A | 1/1984 | Hutchison |
| 4,475,535 | A | 10/1984 | Assaf |
| 4,509,501 | A | 4/1985 | Hunter |
| 4,512,332 | A | 4/1985 | Lansing |
| 4,523,629 | A | 6/1985 | Copeland |
| 4,559,926 | A | 12/1985 | Butler |
| 4,643,212 | A | 2/1987 | Rothrock |
| 4,675,357 | A | 6/1987 | Welch |
| 4,770,162 | A | 9/1988 | L'Esperance et al. |
| 5,058,837 | A | 10/1991 | Wheeler |
| 5,518,311 | A | 5/1996 | Althaus et al. |
| 5,598,990 | A | 2/1997 | Farokhi et al. |
| 5,685,289 | A | 11/1997 | Yogev |
| 5,887,280 | A | 3/1999 | Waring |
| 6,530,369 | B1 | 3/2003 | Yogev et al. |
| 6,959,958 | B2 | 11/2005 | Basford |
| 7,051,529 | B2 | 5/2006 | Murphy et al. |
| 7,255,387 | B2 | 8/2007 | Wood |
| 7,299,633 | B2 | 11/2007 | Murphy et al. |
| 7,458,418 | B2 | 12/2008 | Sienel |
| 7,685,820 | B2 | 3/2010 | Litwin et al. |
| 7,900,871 | B2 | 3/2011 | Rincker et al. |
| 7,961,462 | B2 | 6/2011 | Hernon |
| 8,047,801 | B2 | 11/2011 | Fang et al. |
| 8,157,532 | B2 | 4/2012 | Matesanz Gil et al. |
| 8,434,723 | B2 | 5/2013 | Simpson et al. |
| 8,485,467 | B2 | 7/2013 | Gemma |
| 8,528,601 | B2 | 9/2013 | Dahm et al. |
| 8,657,912 | B2 | 2/2014 | Park et al. |
| 2007/0012041 | A1 | 1/2007 | Goldman |
| 2007/0221208 | A1 | 9/2007 | Goldman |
| 2008/0000231 | A1 | 1/2008 | Litwin et al. |
| 2008/0011290 | A1 | 1/2008 | Goldman et al. |
| 2008/0078380 | A1 | 4/2008 | Kimura et al. |
| 2008/0115817 | A1 | 5/2008 | Defries |
| 2008/0298967 | A1 | 12/2008 | Matesanz Gil et al. |
| 2008/0308094 | A1* | 12/2008 | Johnston ................. F24S 25/00 126/694 |
| 2009/0065734 | A1 | 3/2009 | Yoon et al. |
| 2010/0032016 | A1 | 2/2010 | Gee et al. |
| 2010/0176249 | A1 | 7/2010 | Schwetzler |
| 2010/0236239 | A1 | 9/2010 | Kroizer et al. |
| 2011/0006165 | A1 | 1/2011 | Ireland |
| 2011/0048405 | A1 | 3/2011 | Koetter et al. |
| 2011/0067398 | A1 | 3/2011 | Slocum et al. |
| 2011/0067690 | A1 | 3/2011 | Slocum et al. |
| 2011/0175395 | A1 | 7/2011 | Guigne et al. |
| 2011/0197585 | A1 | 8/2011 | De Martino et al. |
| 2012/0103323 | A1 | 5/2012 | Kruger |
| 2012/0260909 | A1 | 10/2012 | Olalde et al. |
| 2012/0282105 | A1 | 11/2012 | Grife et al. |
| 2012/0293881 | A1 | 11/2012 | Krueger |
| 2013/0047978 | A1 | 2/2013 | Slocum et al. |
| 2013/0175229 | A1 | 7/2013 | Munoz Gilabert |
| 2014/0076380 | A1 | 3/2014 | Kalus et al. |

FOREIGN PATENT DOCUMENTS

| | | |
|---|---|---|
| CN | 102483266 A | 5/2012 |
| CN | 102549351 A | 7/2012 |
| DE | 3533565 A1 | 3/1987 |
| DE | 4331784 A1 | 3/1995 |
| DE | 10056077 A1 | 5/2002 |
| DE | 102011001947 A1 | 10/2012 |
| EP | 2189736 A2 | 5/2010 |
| JP | 61287157 A | 12/1986 |
| JP | 2000-146309 A | 5/2000 |
| JP | 2012-127537 A | 7/2012 |
| WO | WO-2008153922 A1 | 12/2008 |
| WO | WO-2010134028 A2 | 11/2010 |
| WO | WO-2011000522 A2 | 1/2011 |
| WO | 2011019860 A2 | 2/2011 |
| WO | WO-2011027309 A2 | 3/2011 |
| WO | WO-2011039372 A2 | 4/2011 |
| WO | WO-2011085492 A1 | 7/2011 |
| WO | WO-2011135501 A2 | 11/2011 |
| WO | WO-2014020098 A2 | 2/2014 |

OTHER PUBLICATIONS

Wikipedia, "Concentrated Solar Power," retrieved from https://en.wikipedia.org/wiki/Concentrated_solar_power on Apr. 2, 2014 (10 pages).

International Preliminary Report on Patentability dated Aug. 30, 2016 for International Application No. PCT/US2015/030611 (23 pgs).

International Search Report and Written Opinion dated Oct. 23, 2015 for International Application No. PCT/US2015/030611 (18 pgs).

Schmitt, "Center and Radius of a Circle from Three Points", retrieved from http://mysite.verizon.net/res148h4j/zenosamples/zs_circle3pts.html on Oct. 25, 2012 (4 pgs).

Office Action dated May 17, 2018 for Chinese Patent Application No. 201580031280.5 (5 pages).

"Assessment of candidate molten salt coolants for the NGNP/NHI heat-transfer loop," Oak Ridge National Laboratory (Jun. 2006) (44 pages).

A. Rabl, 1978, Tower reflector for solar power plant, Solar Energy, vol. 18, pp. 269-271 (3 pages).

A. Segal, M., Epstein, 2003, Solar Ground Reformer, Solar Energy 75, pp. 479-490 (12 pages).

A. Yogev, A. Kribus, M. Epstein, A. Kogan, 1998, Solar "Tower Reflector" Systems: A New Approach for High-Temperature Solar Plants, J. Hydrogen Energy, vol. 23, No. 4, pp. 239-245 (7 pages).

A.C. Skinrood et al., 1974, Status Report on a High Temperature Solar Energy System, SAND74-8017 (159 pages).

Atten, Pierre et al., "Study of Dust Removal by Standing Wave Electric Curtain for Application to Solar Cells on Mars," 75-86 vol. 1, IAS 2009 (12 pages).

Bahaa I. Kazem, et al. "Cogeneration of Electricity & Desalinated Main Drain Channel River Water using Concentrated Solar Power," First Solar Energy Conference, Baghdad, Dec. 14-16, 2009 (16 pages).

Bharathan et al. (2009) "Progress in Thermal Energy Storage Modeling," Proceedings of the ASME 2009 3rd International Conference of Energy Sustainability, Jul. 19-23, 2009, San Francisco, CA. pp. 1-7 (7 pages).

(56) References Cited

OTHER PUBLICATIONS

Biris, A. S. et al "Electrodynamic Removal of Contaminant Particles and Its Applications," 2004 IEEE (4 pages).

Bohn et al. (1989) "Heat Transfer in Molten Salt Direct Absorption Receivers," Solar Energy 42(1):57-66 (10 pages).

Bradshaw et al., "Improved molten salt formulations for heat transfer fluids in parabolic trough solar power systems," Sandia National Laboratories, pp. 1-9 (undated) (9 pages).

Calle, C.I. et al., "Particle removal by electrostatic and dielectrophoretic forces for dust control during lunar exploration mission," Journal of Electrostatics 67 (2009) 89-92 (4 pages).

Chinese Office Action dated Jun. 4, 2014 in Chinese Application No. 201080049955.6; English Translation, (6 pages).

Corn, M. et al, "Re-entrainment of particles from a plane surface," American Industrial Hygiene Association Journal, 26(4):325-336, 1965 (12 pages).

Elkmann, Nobert et al., "Innovative Service Robot Systems for Facade Cleaning of Difficult-to-Access Areas," proceeding of 2002 IEEE/RSJ Intl. Conference on Intelligent Robots and Systems; Switzerland; Oct. 2002 (7 pages).

F. White, Fluid Mechanics, New York : McGraw-Hill, c1994 (10 pages).

Figuerdo, S., "Parabolic Trough Solar Collectors: Design for Increasing Efficiency," Thesis, Massachusetts Institute of Technology (2011), sections 6.2.1 and 6.4 (16 pages).

Forsberg et al., "High-temperature liquid-fluoride-salt closed-Brayton-cycle solar power towers," 121 J. Solar Energy Engineering, pp. 141-146 (May 2007) (6 pages).

Gaier, James R. and Perez-Davis, Marla, "Aeolian Removal of Dust from Photovoltaic Surfaces on Mars," NASA Technical Memorandum 102507, Feb. 1990 (20 pages).

Gambao, E. and Hernando, M., "Control System for a Semi-automatic Façade Cleaning Robot," ISARC2006 (6 pages).

Greeley, Ronald et al., "Martin dust devils: Laboratory simulations of particles threshold," Journal of Geophysical Research, vol. 108, No. E5, 5041, 2003 (12 pages).

Hasuike et al. (2006) "Study on Design of Molten Salt Solar Receiveres for Beam-Down Solar Concentrator," Solar Energy 80:1255-1262 (8 pages).

Hinds, William C., "Aerosol Technology: properties, behavior, and measurement of airborne particles." Wiley, New York, 2nd edition, 1999 (7 pages).

Hosoya, N. et al., "Wind Tunnel Tests of Parabolic Trough Solar Collectors," National Renewable Energy Laboratory—USA, Mar. 2001-Aug. 2003 (243 pages).

International Preliminary Report on Patentability in PCT/US2010/049474 dated Sep. 17, 2013 (9 pages).

International Preliminary Report on Patentability in PCT/US2010/053438 dated Mar. 4, 2014 (7 pages).

International Search Report and Written Opinion in PCT/US2010/049474 dated Aug. 20, 2013 (16 pages).

Invitation to Pay Additional Fees and Partial Search Report in PCT/US2010/049474 dated Jun. 13, 2013 (6 pages).

J. E. Pacheco, S. K. Showalter, and W. J. Kolb, 2002, Development of a Molten-Salt Thermocline Thermal Storage System for Parabolic Trough Plants, J. Solar Energy Engineering, 124, pp. 153-159 (7 pages).

Landis, G. A., "Dust obscuration of mars solar arrays," Acta Astronautica, 38(11): 885{891, Jun. 1996 (7 pages).

Landis, Geoffry A., "Mars Dust-Removal Technology", J. Propulsion and Power. vol. 14, No. 1, Jan.-Feb. 1998 (3 pages).

Lee, Sangasan et al., "Prediction of Vortex-induced wind loading on long-span bridges", Sangasan Lee, Jae Seok Lee, Jong dae Kim, Journal of Wind Engineering and industrial Aerodynamics 67&68 (1997) 267-278 (12 pages).

M. Epstein, A. Segal and A. Yogev, 1999, A molten salt system with a ground base-integrated solar receiver storage tank, J Phys. IV France 9 (10 pages).

Marticorena, B. et al., "Modeling the atmospheric dust cycle: 1. Design of a soil-derived dust emission scheme," Journal of Geophysical research, vol. 100, No. D8, pp. 16,415-16.430. Aug. 20, 1995 (16 pages).

Microsharp News Letter Jul. 2006, Innovators in Light Management Technology, (4 pages).

Mitra, Forbes, Energy recovery, 2008. http://www.forbes.com/technology/2008/05/08/mitra-energy-recovery-tech-science-cx_sm_0509mitra.html (3 pages).

Miyake, Tohru et al., "Development of Small-Size Window Cleaning Robot by Wall Climbing Mechanism," ISARC2006 (6 pages).

Moreno, Luis et al., "Low Mass Dust Wiper Technology for MSL Rover"; In Proceeding of the 9th ESA Workshop on Advanced Sapace Technologies for robotics and Automation; Noordwijk, the Netherlands, Nov. 28-30, 2006 (7 pages).

Moses et al., "An experimental study of laminar plumes," J. Fluid Mech., v. 251, pp. 581-601 (1993) (21 pages).

Office Action dated Mar. 19, 2019 for Japanese Patent Application No. 2016-567,632 (5 pages) (+ English Translation).

Otanicar et al. (2009) "Impact of Size Scattering Mode on the Optimal Solar Absorbing Nanofluid," Proceedings of the ASME 2009 3rd International Conference of Energy Sustainability, Jul. 19-23, 2009, San Francisco, CA. pp. 1-6 (6 pages).

Paxson (2009) "Design and Validation of an Air Windowfor a Molten Satl Solar Thermal Receiver," Bachelor of Science thesis, Massachusetts Institute of Technology (61 pages).

Pera et al., "Laminar plume interactions," J. Fluid Mech., v. 68, pt. 2, pp. 259-271 (1975) (23 pages).

R. J. Copeland, J. Green, 1983, Raft Thermocline Thermal Storage, Proc. Intersociety Energy Conversion Conference, pp. 1801-1805 (6 pages).

R. J. Copeland, R. E. West, F. Kreith, 1984, Thermal Energy Storage at 900C, Proc. Intersociety Energy Conversion Conference, pp. 1171-1175 (7 pages).

Sargent & Lundy LLC Consulting Group. Assessment of parabolic trough and power tower solar technology cost and performance forecasts, 2003 (344 pages).

Scase et al., "Time-dependent plumes and jets with decreasing source strengths," J. Fluid Mech., v. 563, pp. 443-461 (2006) (19 pages).

Schonfeldt, H.J. "Turbulence and Aeolian Sand Transport," Apr. 16, 2008, EGU Vienna)—2008 (21 pages).

Sherman, R. et al., "Dry surface cleaning using CO2 snow," Journal of Vacuum Science & Technology B, 9(4):1970-1977, Jul.-Aug. 1991 (8 pages).

Sherman, R., "Carbon dioxide snow cleaning," Particulate Science and Technology, 25(1):37-57, Jan.-Feb. 2007 (22 pages).

Shin et al. (2009) "Investigation of Nanofluids for Solar Thermal Storage Applications," Proceedings of the ASME 2009 3rd International Conference of Energy Sustainability, Jul. 19-23, 2009, San Francisco, CA. pp. 1-4 (4 pages).

Slocum, Alexander H. et al., "Concentrated solar power on demand," Solar Energy, ScienceDirect, 2011, pp. 1519-1529 (11 pages).

Tamaura et al., "A novel beam-down system for solar power generation with multi-ring central reflectors and molten salt thermal storage," 13th Intl. Symp. on Concentrated Solar Power and Chemical Energy Tech., (2006) (3 pages).

Trombe et al. (1973) "Thousand KW Solar Furnace, Built by the National Center of Scientific Research, in Odeillo (France)," Solar Energy 15:57-61 (5 pages).

Tyagi et al. (2009) "Thermochemical Conversion of Biomass Using Solar Energy: Use of Nanoparticle-Laden Molten Salt as the Working Fluid," Proceedings of the ASME 2009 3rd International Conference of Energy Sustainability, Jul. 19-23, 2009, San Francisco, CA. pp. 1-10 (10 pages).

Tyagi, "Radiative and combustion properties of nanoparticle-laden liquids," Ph.D. Thesis, Arizona State University (2008) (91 pages).

U. Herrmann, B. Kelly, and H. Price, 2004, Two-tank molten salt storage for parabolic trough solar power plants, Energy 29, pp. 883-893 (11 pages).

Vaupell Rapid Prototyping Stereolithography resin. http://www.vaupell.com/stereolithography-sla (2 pages).

(56) References Cited

OTHER PUBLICATIONS

W. Stoke, 1999, Solar Two Central Receiver, California Energy Commission, Contract No. 500-97-012 (232 pages).
W.D. Drotning, 1977, Optical Properties of a Solar-Absorbing Molten Salt Heat Transfer Fluid, SAND77-0938 (16 pages).
Williams, Brett R. et al. "Vibration Characterization of Self-Cleaning Solar Panels with Piezocermic Actuation"; AIAA, 2007(9 pages).
Yamagishi et al., "Experimental research on heat transfer enhancement for high temperature molten salt flow using nano particle layers," National heat transfer symp. of Japan 44 (May 2007) (2 pages).
Zhang, Houxiang et al., "Realization of a Service Climbing Robot for Glass-wall Cleaning," Proceedings of the 2004 IEEE, International Conference on Robotics and Biomimetics, Aug. 22-26, 2004, Shenyang, China (6 pages).
Zinoubi et al., "Development of an Axisymmetric thermal plume between vertical plates," American J. Appl. Phys. 4(9), pp. 679-685 (2007) (7 pages).
Office Action dated Jan. 7, 2019 for European Patent Application No. 15728239.3 (11 pages).

\* cited by examiner

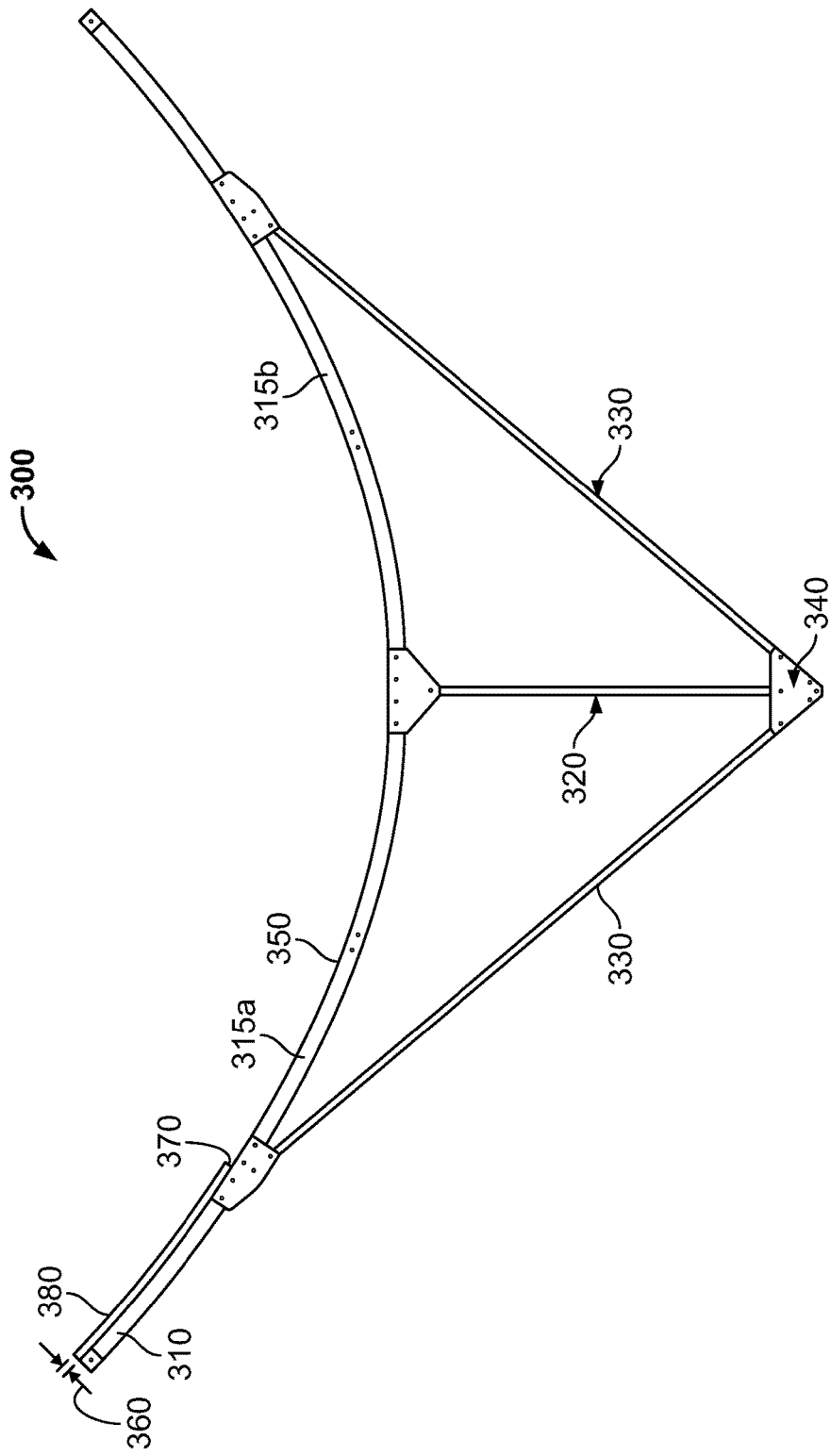

LOW COST PARABOLIC CYLINDRICAL TROUGH FOR CONCENTRATED SOLAR POWER

CROSS-REFERENCE TO RELATED APPLICATIONS

This application is the national stage of International (PCT) Patent Application No. PCT/US2015/030611, entitled "Low Cost Parabolic Cylindrical Trough for Concentrated Solar Power" and filed on May 13, 2015, which claims priority to and the benefit of U.S. Provisional Patent Application No. 61/992,373, entitled "Low Cost Parabolic Cylindrical Trough for Concentrated Solar Power" and filed on May 13, 2014, each of which is hereby incorporated by reference herein in its entirety.

FIELD OF THE INVENTION

The present disclosure relates to troughs for use in solar power systems, and methods for formation thereof.

BACKGROUND

A concentrated solar power system focuses the sun's energy to heat a working fluid to generate steam for use in a conventional heat engine, usually a steam turbine, to produce electricity. Typically, a parabolic cylindrical reflector, frequently referred to as a trough, focuses the solar energy on a receiver, or absorber, lying along the focal line of the reflector. Referring to FIG. 1, in an exemplary system, a number of reflectors 100 are installed in a large array 110, and provisions incorporated to track the movement of the sun in order that the sunlight impinging on each reflector may be concentrated on its receiver 120. The receivers are interconnected so that the working fluid can flow in continuous loops through the field and heat engine. See http://en.wikipedia.org/wiki/Concentrated_solar_power, image of part of the 354 MW SEGS solar complex in northern San Bernadino County, Calif.

Referring to FIG. 2, an energy collection mechanism suitable for use in the system of FIG. 1 may include a solar collector/concentrator 200 having a reflective surface 210 defining a parabolic cylindrical shaped trough 220. A supporting structure, such as a truss system, may be provided for the surface. The supporting structure may be adapted to change the pointing direction of the surface to, e.g., track the direction of the incoming solar energy and/or to provide for stowage of the trough structure. Structures 230a and 230b may be provided at each end of the trough to support the tubular receiver 250 which is located along the focal line of the trough. These structures are affixed to the trough in such a way that the trough can pivot about the top of the posts under the control of actuators 240. See U.S. Patent Publication No. 2013/0047978, incorporated herein by reference to the maximum extent permitted by applicable law.

Large parabolic reflectors, e.g., troughs, may be challenging and expensive to fabricate due to the high degree of surface accuracy necessary for high efficiency. A contributing factor is that the reflective surface preferably maintains parabolic accuracy over various operational conditions, including over the range of pointing angles and over variable wind and heat loading. A driving factor is that the structures, e. g., ribs and/or trusses, used for supporting the reflective surface and maintaining its accuracy need to be precisely engineered and manufactured. A common technique is to use water jet fabrication for these trusses, an expensive process. Alternatively these structures can be manufactured less precisely, but then many adjustments and alignments may need to be made in the field to the structure to achieve the necessary degree of accuracy.

There is a need for an inexpensive method for accurately forming, shaping, and maintaining structures for use with parabolic reflectors, as well as a need for large, accurately shaped reflective surfaces.

SUMMARY

In accordance with an embodiment of the invention, a method enables building large (e.g., having an aperture of 6 m by 12 m) parabolic cylindrical troughs for the collection and concentration of solar energy. Large troughs may be inexpensively fabricated from industry standard metal components at a low assembly cost and which maintain high inherent collection efficiency under operational conditions. The high efficiency is a consequence of the surface profile accuracy, typically in the range of a very few millimeters, or around a few parts in ten thousand, which may enable near 100% collection efficiency by the trough. Moreover, the panels from which the troughs are fabricated do not need to be pre-curved, as they assume the shape of ribs fabricated in accordance with embodiments of the invention. The elimination of the pre-curving step results in an economic advantage.

In an aspect, embodiments of the invention include a reflector for solar concentration, the reflector including (i) a reflective assembly comprising a plurality of elongate panels forming a continuous trough; and (ii) a frame configured to support the panels, wherein the frame with attached panels defines a parabolic contour on the top side of the trough.

One or more of the following features may be included. The plurality of panels may be joined using at least one of z-bends or flanges, attached to each other by at least one of adhering, bolting, and riveting. The plurality of panels may be joined using a connecting strip or channel, attached to the panels by at least one of adhering, bolting, and riveting. A connecting strip may be disposed across a seam defined by adjacent panels.

The reflective assembly may include at least three panels. At least one panel may include a metal sheet. At least one panel may include a film disposed on a substrate.

The frame may include a plurality of spaced supports. At least one support may include a truss. The truss may include at least one rib having a surface defining an offset parabola. The at least one rib may include a tube.

In another aspect, embodiments of the invention include a method of manufacturing a solar reflector, the method including aligning a plurality of elongate panels over an arcuate surface, to form a continuous trough; and affixing a frame to back sides of the panels.

One or more of the following features may be included. The plurality of panels may include at least three panels. The arcuate surface may define an offset parabola. The frame may include a plurality of spaced supports. At least one support may include a truss. The truss may include at least one rib having an offset parabolic surface. The at least one rib may include a tube. The plurality of panels may be interconnected with flanges. The plurality of panels may be interconnected by welding, brazing, bolting, and/or adhering.

In still another aspect, embodiments of the invention include a method for forming a tube having an offset parabolic surface. The method includes inserting a hollow tube between rollers of a ring rolling machine. A portion of the tube is rolled into an arc having a predetermined radius of curvature. The machine is adjusted and a next portion of the tube is rolled into an arc having a different predetermined radius of curvature than an immediately preceding radius of curvature; this step is repeated one or more times to complete forming the offset parabolic surface of the tube.

One or more of the following features may be included. Each predetermined radius of curvature may include a radius of a circle fitted to three equi-spaced points on an offset parabola to be defined by the hollow tube. The hollow tube may include aluminum, galvanized steel, and/or steel. The tube may include a cross-section defining a square and/or a rectangle.

In yet another aspect, embodiments of the invention include a rib having a lower tube including a first hollow tube. An upper tube may include a second hollow tube and be spaced from the lower tube. A plurality of spacers may be disposed between the lower and upper tubes. At least the upper tube may define an offset parabolic surface.

One or more of the following features may be included. At least one of the first and second hollow tubes may include aluminum, galvanized steel, and/or steel. The plurality of spacers may include aluminum, galvanized steel, and/or steel. The rib may include a king post and at least two braces supporting the lower tube.

In another aspect, embodiments of the invention include a method for correcting an improperly curved elongate tube. The method includes making a cut through a portion of the tube. The tube is bent into an offset parabolic contour. A predetermined contour is stabilized by applying a partner to the cut.

One or more of the following features may be included. Bending the tube may include using a ring rolling machine. The tube may be hollow. The partner may include aluminum, galvanized steel, and/or steel.

BRIEF DESCRIPTION OF FIGURES

FIG. 3 is a schematic side view of a rib constructed in accordance with an embodiment of the invention;

DETAILED DESCRIPTION

Figure 1:
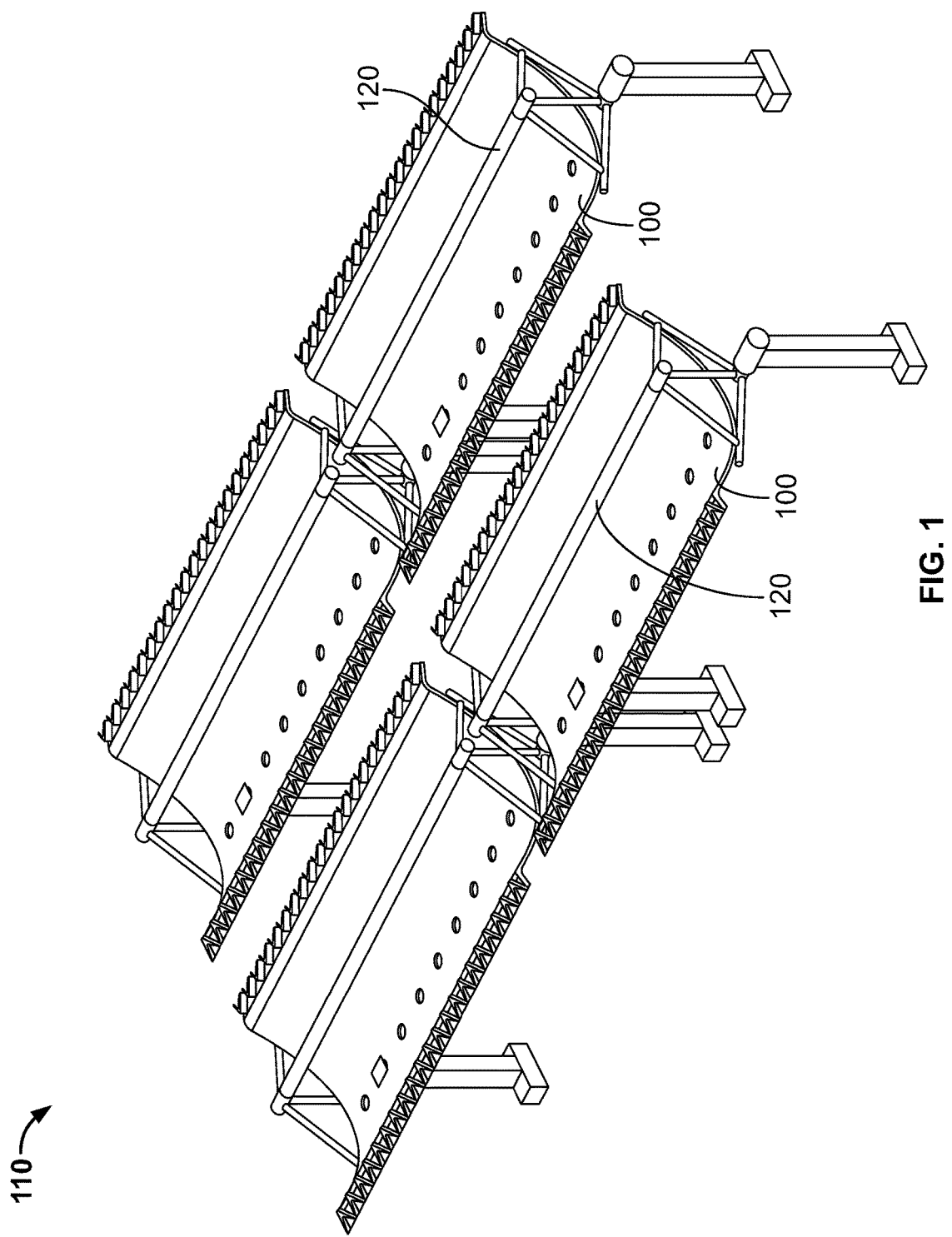
FIG. 1 is a schematic view of an array of concentrated solar power troughs.
Figure 2:
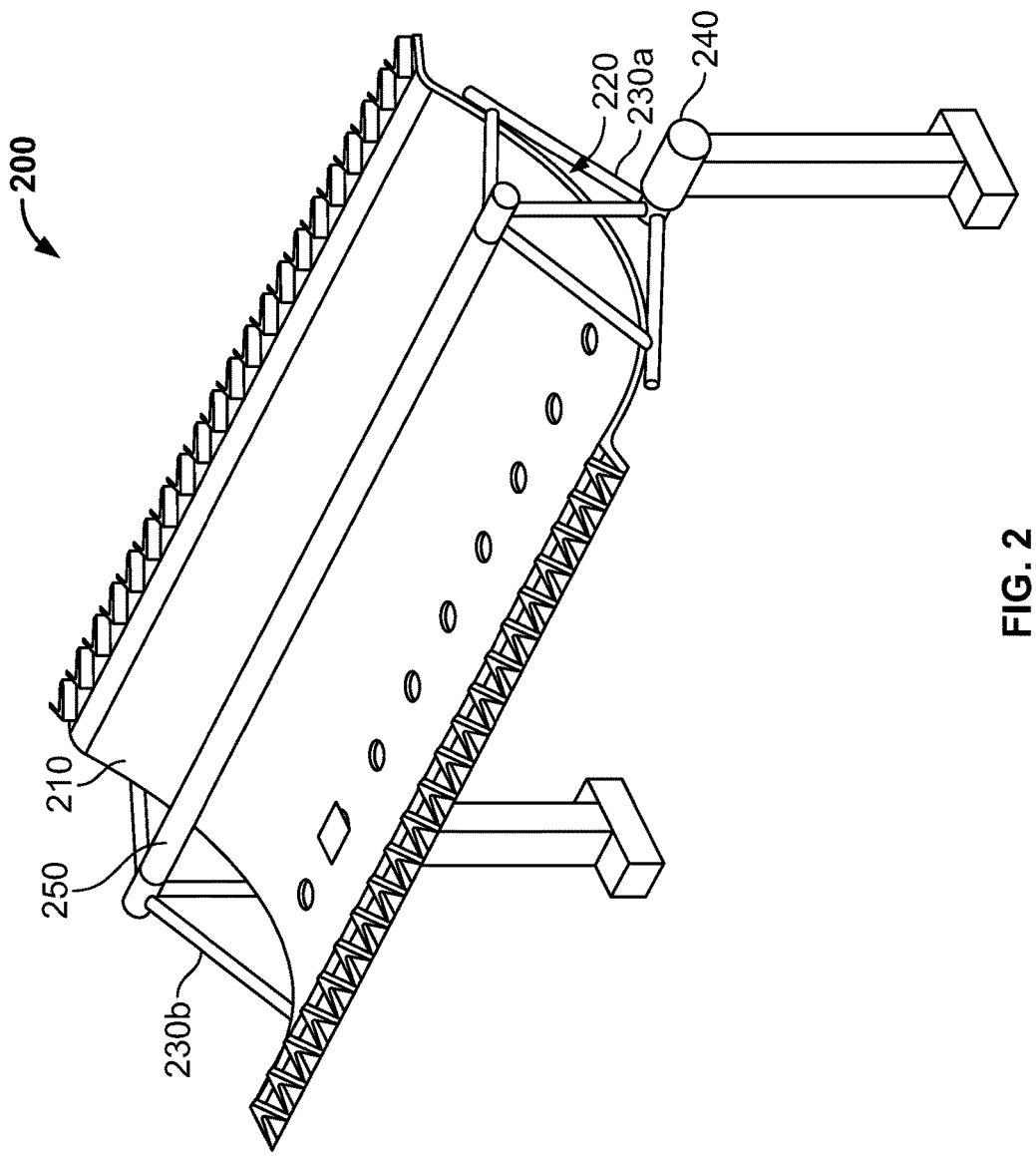
FIG. 2 is a schematic isometric view of a parabolic cylindrical trough, in accordance with the prior art.

Generally, a method for precisely fabricating a large parabolic trough for concentrating solar power includes assembling a plurality of rectangular reflective panels by aligning the edges of adjacent panels, and mechanically affixing the backside of these panels to a set of precisely shaped ribs to define the parabolic trough. An innovative method for shaping the ribs is provided. An innovative design wherein the reflective panels, implemented as a continuous shell, play an essential role in contributing to the over-all stiffness and strength of the trough is provided.

Preferably, industry standard materials and techniques are used, obviating the need to fabricate special components. Galvanized materials may be used for corrosion protection and avoidance of maintenance, such as painting.

Fabrication of Precisely Shaped Ribs

In an embodiment, precision ribs may be fabricated to facilitate the formation of a parabolic trough. Referring to FIG. 3, a single-braced rib 300, i.e. a rib with a single brace per side, incorporates an upper tube 310 composed of a precision-rolled tube, rolled from an industry standard sized hollow tube. The upper tube may be composed of two half-tubes (315a, 315b) (e.g., identical half-tubes) joined at the center, or alternatively may be rolled from a single tube. The upper tube may be combined with a kingpost 320, e.g., a vertical post, and braces 330 to provide a stiff and stable structure, with the braces and kingpost also being fabricated from standard tube sizes. Joining plates 340 may be provided to connect the various structural elements into a rigid structure. Some combination of structural adhesives, bolts, rivets, welding, or other metal joining techniques may be used to join the rib parts to generate a rigid structure.

Each of the tubes may be a standard-sized hollow tube made from, e.g. aluminum or galvanized steel. Galvanized steel may be a less expensive alternative, while aluminum may be desired for its lower weight. Ribs for use at the ends of the trough typically are stronger than the inner ribs spaced between the end ribs because the end ribs bear the entire weight of the trough. The curved upper tube suitable for an inner rib may have a rectangular cross-section (e.g., a square cross-section, or a cross-section having dimensions of 40 mm wide by 80 mm deep), with a thickness of 3 mm. Other structural members for an inner rib might have dimensions of 40 mm by 40 mm by 3 mm. The upper tube suitable for an end rib may have dimensions of 80 mm by 120 mm with a thickness of 4 mm, or be composed of several curved tubes joined together to get adequate strength. Other structural members for an end rib might have dimensions of 80 mm by 80 mm by 4 mm. Hollow tubes are preferred in general because of their stiffness to weight ratio.

The curved upper tubes may shaped in an industry standard rolling machine, e.g., a three-roller rolling machine, such as a CE 100 Angle Roll/Section Bender, available from Ercolina CNC, Davenport, Iowa.

The accuracy of the trough reflective surface may be determined by the accuracy of the upper or top surface 350 of the ribs 300. It is to be understood that the reflecting surface 380 of the trough is to follow a parabolic shape, and that the surface 350 of the upper tube 310 is offset from the parabola by the thickness 360 of the reflecting surface panels 370 themselves, e.g., a panel thickness 360 of 1.61 mm. Accordingly the desired shape of the upper surface of the upper tube of the rib is an offset parabola. Although only one panel 370 is illustrated in FIG. 3, one of ordinary skill in the art will appreciate that a plurality of reflecting surface panels 370 may be disposed on the top surface 350 of the ribs.

Figure 4A:
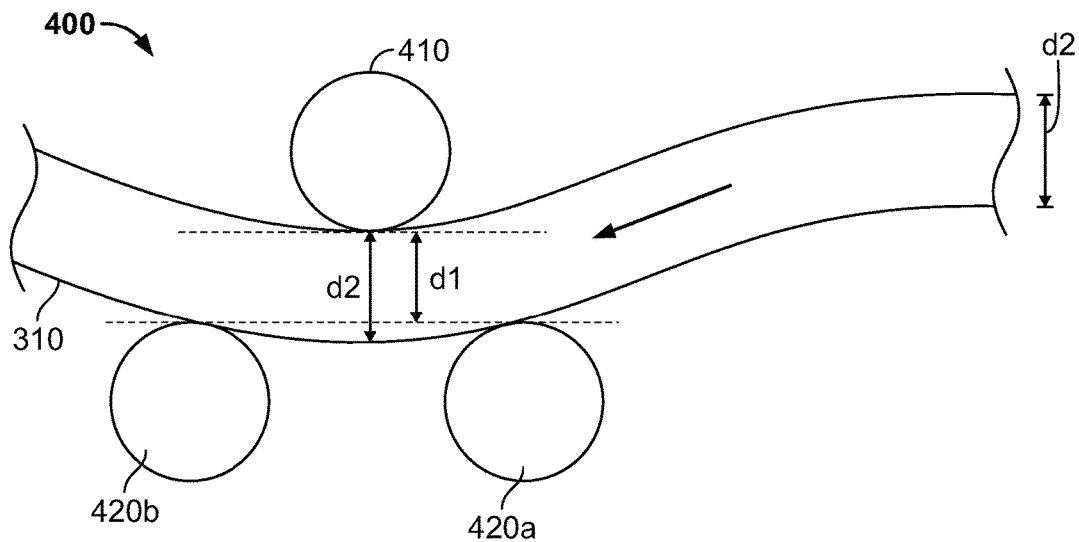
FIG. 4A is a schematic side view of a tube being curved in a 3 roller rolling machine in accordance with an embodiment of the invention.

Referring to FIG. 4A, industry standard three-roll rolling machines roll straight shapes into circular arcs. A three-roll rolling machine 400 typically has an upper roller 410 and two lower rollers 420, defined by a variable spacing $d_1$ between the bottom of the upper roller and a straight line connecting the tops of the lower rollers. A tube 310 having a depth $d_2$ may be fed between the three rollers, as long as $d_2$ is less $d_1$. For instance, a tube of 80 mm depth may be easily fed into the machine if the spacing $d_1$ is increased to 85 mm or so. After just the tube end is inserted into the rolling machine, the variable spacing $d_1$ is preferably reduced to a value less than $d_2$ (e.g., less than 80 mm in the example) depending on the degree of curvature that is desired to be created in the tube. As the tube is forced through the rollers, it becomes curved into a circular arc.

Offset parabolas may be used for the formation of a parabolic trough. The equation for a parabola of focal length Fl with focal point at the origin is given by the equation $$z(x) = -Fl + x^2/(4*Fl)$$

For a panel of thickness t, the offset parabola curve for the top of the rib to which the the panel will be applied is given by the equation $$z'(x) = -Fl + x^2/(4*Fl) - t/(2*Fl)*SQRT(x^2 + 4*Fl^2)$$

It has been demonstrated that by approximating the desired offset parabola by a set of circular arcs, i.e., at least two and preferably three circular arcs for each half of the parabolic arc, the desired accuracy can be achieved in practice.

Figure 4B:
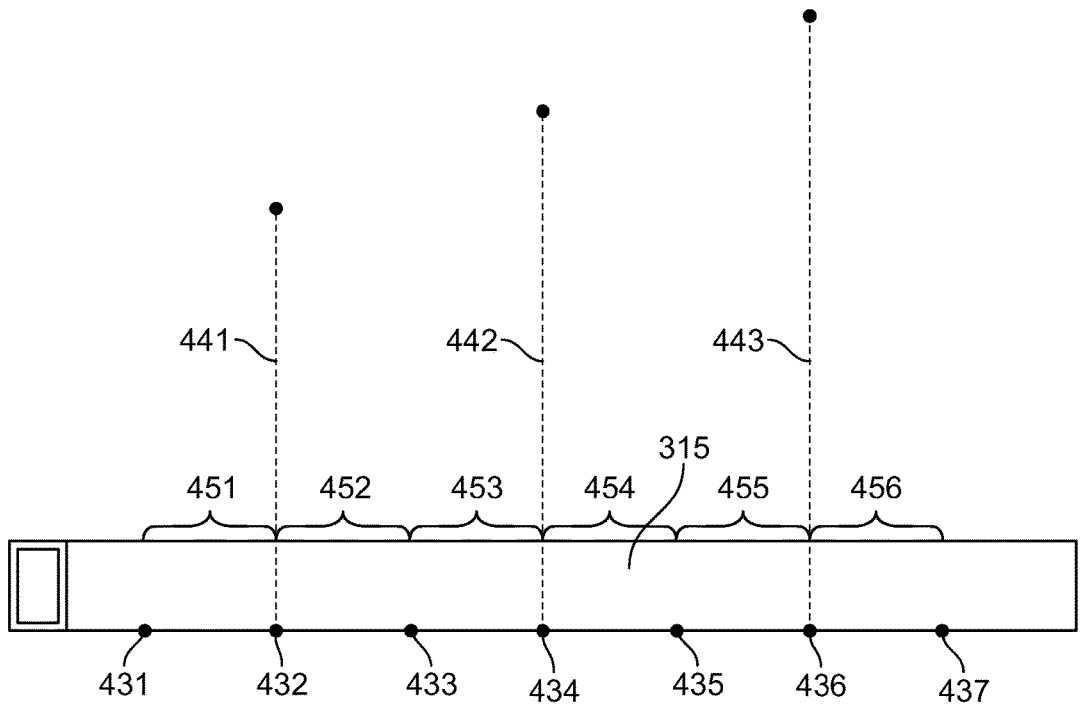
FIG. 4B is a schematic side view of a half-tube illustrating the selection of different radii and centers to define radii of curvature in a three circle approximation method in accordance with an embodiment of the invention.

Referring to FIG. 4B, a three circle approximation may be executed to roll a half tube 315 as follows. A set of seven equi-spaced reference points 431-437 divide the half-tube 315 into six equal-length segments 451-456, leaving some material at each end to support the half-tube in the rolling machine when it is moved beyond the extremes of the portion to be rolled. Circular approximations are calculated for the three sections from reference points 431 to 433, from 433 to 435, and from 435 to 437, with three differing radii of curvature (radius 441, radius 442, radius 443) as shown. A straight half-tube is inserted between the rollers of a three-roller rolling machine. The rollers are first spaced to provide the radius of curvature, radius 443, appropriate for the end section from reference points 435 to 437 of the upper half-tube, and the entire half-tube between points 431 and 437 is rolled to this radius of curvature. Next, after the partially rolled half-tube is positioned so that the end section from reference points 435 to 437 is beyond the rollers, the roller spacing is decreased to provide the smaller radius of curvature appropriate for the section from reference points 433 to 435, and the half-tube is rolled between points 431 and 435. Next, after the partially rolled half-tube is positioned so that the portion from reference points 433 to 437 lies beyond the rollers, the roller spacing is again decreased to provide the smaller radius of curvature appropriate for the section from reference points 431 to 433, and the half-tube is rolled between points 431 and 433. Finally the rollers are moved apart to release the curved upper half-tube, and the excess un-rolled straight material outside points 431 and 437 is removed. During this process, adjustments may initially be made to compensate for the tendency of the rolled half-tube to "springback" from the profile as rolled, but once these calibration adjustments are made, successive half-tubes can rolled without adjustments. In practice, undertaking some practice rolls may be useful, and an accurate water-jet cut template may be used to check progress and make fine adjustments. Further, minor adjustments to the process, as recognized by one of skill in the art, may smooth transitions between the three approximating circles.

It can be seen that the above process may be extended to roll an entire upper tube 310 instead of a half-tube 315 as described.

Figure 5A:
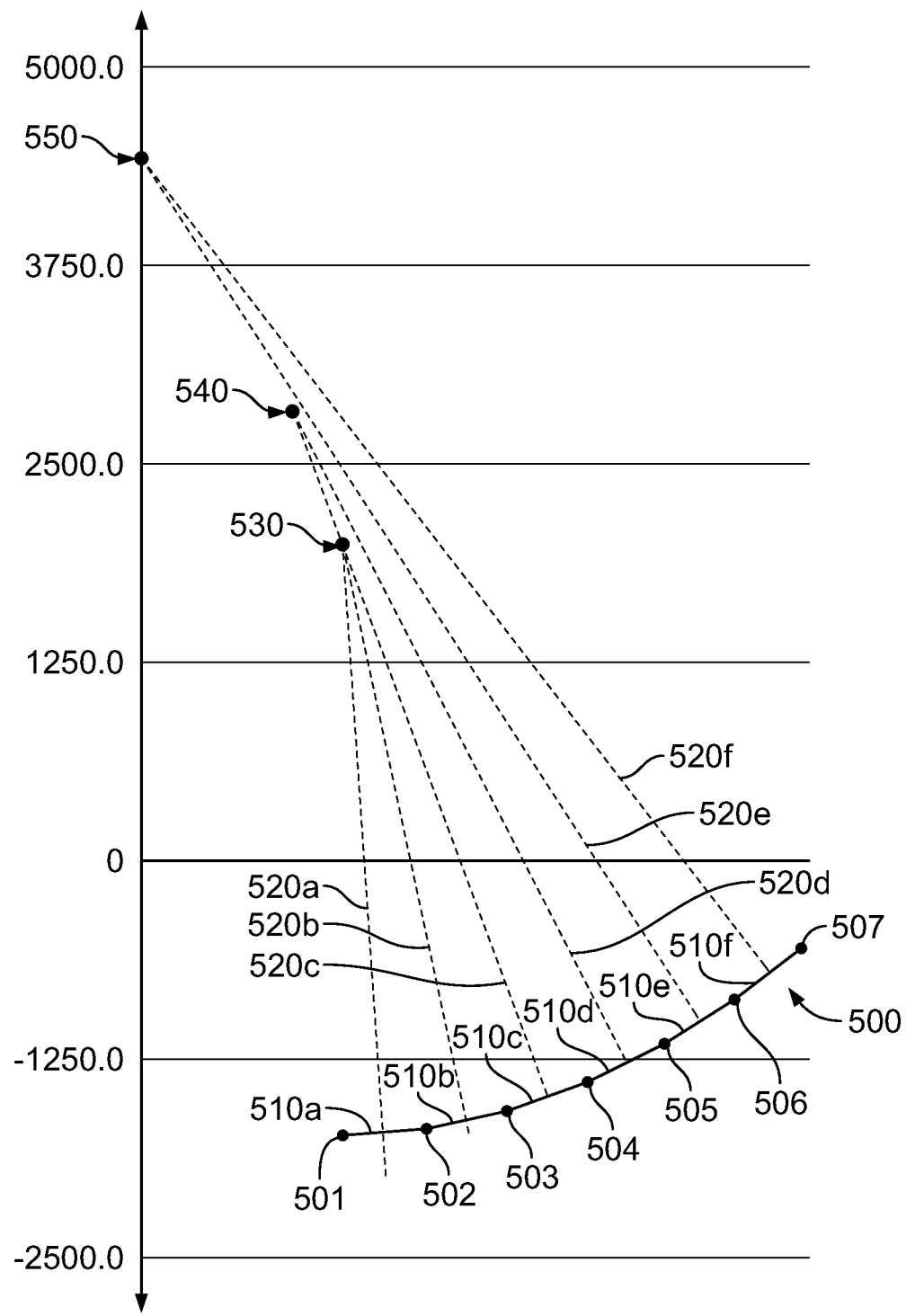
FIG. 5A is an illustration of the three circle method for approximating an offset parabola in accordance with an embodiment of the invention.
Figure 5B:
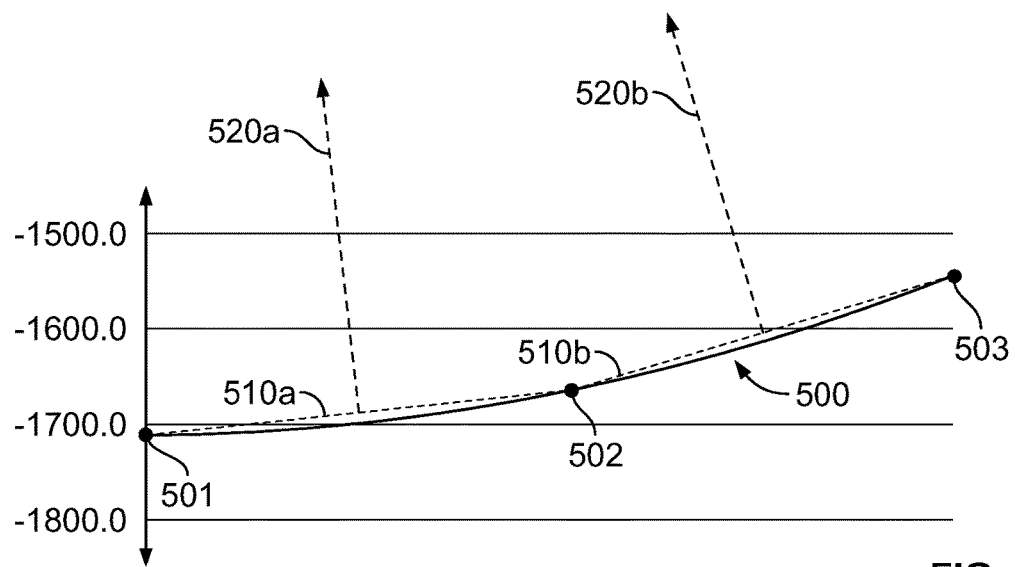
FIG. 5B is a detailed illustration of the steps involved in the three circle approximation method in accordance with an embodiment of the invention.

For a section of an offset parabola, the parameters of a circle, e.g., its center and its radius, can be calculated so that the circle intercepts the offset parabola at three points, i.e., the beginning of the section, the mid-point of the section, and the end point of the section of the offset parabola. The points of the circle defining the circular arc accordingly can be a good approximation to the parabola if the arc angle is not too large. FIGS. 5A and 5B illustrate a three circle approximation for a half-tube for a parabola with focal point at the origin and with focal length of 1710 mm. The offset parabolic curve 500 is divided into six segments by a set of seven equi-spaced points 501-507 lying on the surface of the offset parabolic curve from its center to its outer edge. Six straight lines 510 connect these seven points, and six orthogonal lines 520 are erected perpendicular to these connecting lines. The intersection point 530 of the first two orthogonal lines determines the center of the first approximating circle. The intersection point 540 of the second pair of orthogonal lines establishes the center of the second circle. The intersection point 550 of the third pair of orthogonal lines determines the center of the third circle. The radius of the first approximating circle is the distance from point 530 to any of the points 501, 502, or 503, which distances are equal by construction. Similarly, the radius of the second approximating circle is the distance from point 540 to any of points 503, 504, or 505, which distances are equal by construction, and so on for the third circle. The first circular arc will pass through the points labeled 501, 502, 503; the second circle will pass through the points 503, 504, and 505 and so on. By this three circle approximation a small discontinuity in slope is created at the points 503 and 505 where arcs of two different radii join, but this is small in practice and tends to be smoothed by the properties of the rolling machine.

The approximation of a circle on the basis of three points is well known to one of skill in the art, and is described in, e.g., "Center and Radius of a Circle from Three Points" by Stephen R. I Schmitt, available at http://mysite.verizon.net/res148h4j/zenosamples/zs_circle3pts.html, and reproduced below:

Given three points, how does one find the center and radius of a circle fitting those points? Three points determine a unique circle if, and only if, they are not on the same line. From analytic geometry, we know that there is a unique circle that passes through the three points:

$$(x_1, y_1), (x_2, y_2), (x_3, y_3)$$

It can be found by solving the following determinant equation:

$$\begin{vmatrix} x^2+y^2 & x & y & 1 \\ x_1^2+y_1^2 & x_1 & y_1 & 1 \\ x_2^2+y_2^2 & x_2 & y_2 & 1 \\ x_3^2+y_3^2 & x_3 & y_3 & 1 \end{vmatrix} = 0$$

This can be solved by evaluating the cofactors for the first row of the determinant. The determinant can be written as an equation of these cofactors:

$$(x^2+y^2)M_{11} - x \cdot M_{12} + y \cdot M_{13} - M_{14} = 0$$

Since, $(x^2+y^2)=r^2$ this can be simplified to $$r^2 - x \cdot \frac{M_{12}}{M_{11}} + y \cdot \frac{M_{13}}{M_{11}} - \frac{M_{14}}{M_{11}} = 0$$

The general equation of a circle with radius $r_0$ and center $(x_0, y_0)$ is $$(x-x_0)^2 + (y-y_0)^2 - r_0^2 = 0$$

Expanding this gives, $$(x^2 - 2x \cdot x_0 + x_0^2) + (y^2 - 2y \cdot y_0 + y_0^2) - r_0^2 = 0$$

Re-arranging terms and substitution gives, $$r^2 - 2x \cdot x_0 - 2y \cdot y_0 + x_0^2 + y_0^2 - r_0^2 = 0$$

Equating the like terms from the determinant equation and the general equation for the circle gives:

$$x_0 = +0.5 \frac{M_{12}}{M_{11}}$$

$$y_0 = -0.5 \frac{M_{13}}{M_{11}}$$

$$r_0^2 = x_0^2 + y_0^2 + \frac{M_{14}}{M_{11}}$$

Note that there is no solution when $M_{11}$ is equal to zero. In this case, the points are not on a circle; they may all be on a straight line.

Four or more circles may be used to better approximate the offset parabola, but three have proved adequate in practice to reduce errors to less than 1 mm.

For example, for a parabola with a focus at the origin, a focal length of 1.71 meters and an offset of 1.61 mm as a consequence of using 1.61 mm thick panels, the first approximating circle constructed using the procedure described above will be centered at x=−0.012 m and y=1.852 m with radius 3.65 m, passing through points 501, 502 and 503 of the offset parabola as shown in detail in FIG. 5B.

Advantageously, if a rolling machine is available that can dynamically vary the spacing of the rollers (e.g., dynamically vary the spacing continuously or continually) as a function of position as the tube is moved through the rollers in accordance with the desired profile, circular approximations are not necessary and the tube can be rolled ideally in one continuous pass.

Two methods have been devised to improve and maintain rolling accuracy beyond what can be provide from rolling in a three roll machine. A precise jig may be used to assemble each rib, incorporating for example, an accurate surface to bear against the top of the rib. First, since the upper tube is braced to form the rib, as shown in FIG. 3, the braces 330 in conjunction with the kingpost 320 can be used to hold to the tube to the correct position at the three attachment points and remove certain large errors. Typically the braces are attached to the upper tube % of the way along the extent of the upper tube. The braces can be locked into position such that accuracy is enforced and maintained at the points of brace and kingpost attachment.

Figure 6A:
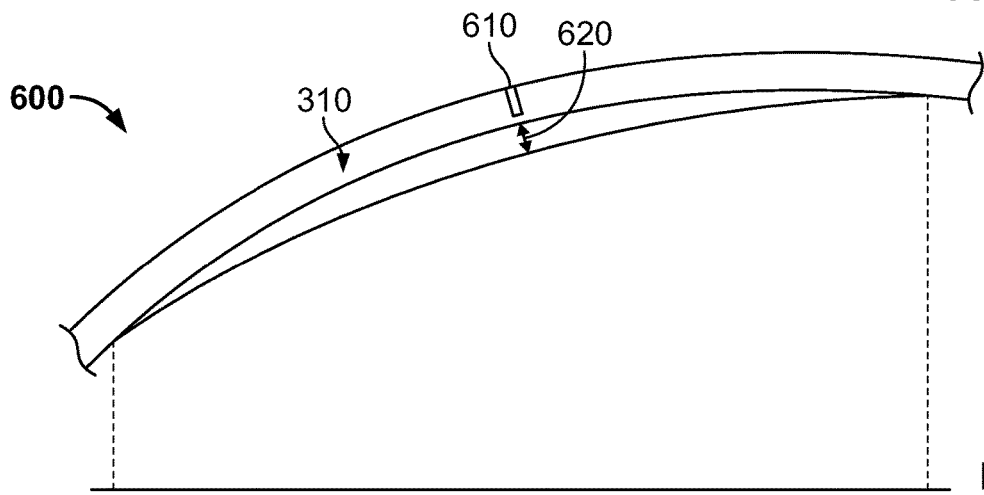
FIGS. 6A and 6B are schematic side views of a tube with corrected curvature in accordance with an embodiment of the invention.
Figure 6B:
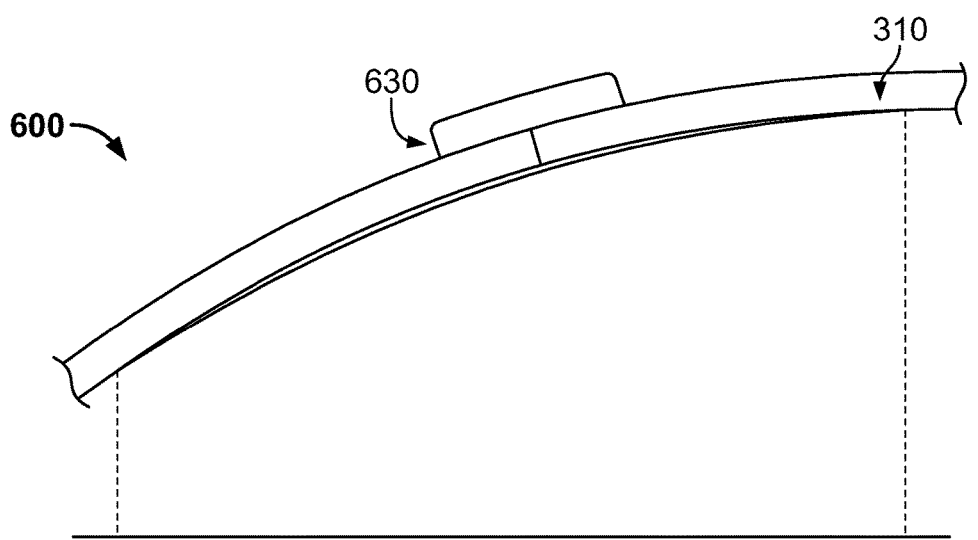

Second, the tube may be partially cut, bent at the cut to remove error near that point, and then have its strength restored in such a way that the tube retains its new shape. In these "cut and restore" designs a precision jig 600 may be used to advantage. Referring to FIG. 6A which depicts the details of this operation, an improperly curved tube 310 is cut 610 partially through, at a point where the error 620 is to be reduced, on the side away from the side that will face the trough surface. With its strength weakened, the tube is reshaped by being forced against the precision jig having the requisite shape, and then secured in this position by having material affixed over the cut in a manner that restores the structural strength of the tube. FIG. 6B reflects one convenient way of restoring the strength by affixing a partner 630 to the cut tube to restore its strength. The partner conveniently may be of the same dimensions and material as the tube itself. Other strength restoring methods may include welding at the cut or affixing plates to the side and top and of the tube or affixing a channel shape over the cut. The ability of this method to correct errors in the curved tube depends on the ratio of the stiffness, or inertia, of the cut tube to the stiffness, or inertia, of the tube with its strength restored, and can easily be a ratio exceeding 10, so that errors may be well corrected. This type of design may called a high-inertia ratio design.

Rolling machines are limited in the sizes of the material that they can roll, depending on the depth and thickness of the tube being rolled. End ribs on long and wide troughs may require dimensions that cannot be rolled by available machines. In these cases a composite rib assembly may be necessary.

Figure 7:
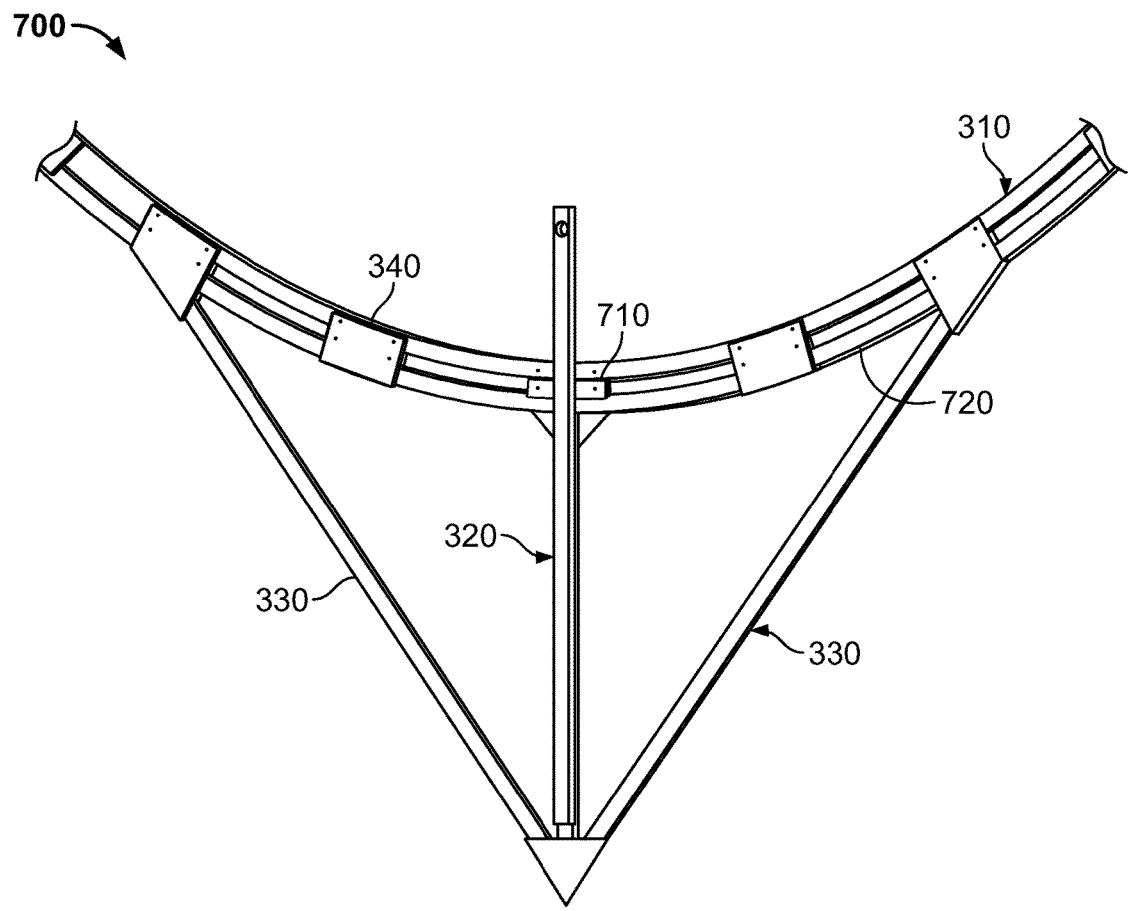
FIG. 7 is a schematic side view of a rib constructed in accordance with an embodiment of the invention.

Referring to FIG. 7, in an exemplary embodiment, a composite rib assembly 700 may include a sandwich structure, comprising an upper curved tube 310 and a lower curved tube 720, with a plurality of short curved spacing tubes (or partners) 710 disposed between the upper and lower tubes. In a single braced design, two braces 330 and a kingpost 320 are joined to the sandwich of tubes to produce a stiff rib. These tubes and the braces and kingpost may be joined, using plates disposed on each side of the rib, by some combination of structural adhesives, bolts, rivets, welding, or other metal joining techniques to generate a rigid rib structure. The area of the plates is selected to provice sufficient over-lap with the structural members to result in strong joints. From strength to mass considerations, all tubes are preferably hollow. A three roll rolling machine can be used to shape the tubes, with the curvatures of the spacing tubes and of the lower tube preferably being different from that of the offset parabolic upper tube 310, such that new circular approximations may be calculated for the lower tube and the spacers.

In an exemplary composite rib, the curved tubes and spacers may be fabricated from hollow tubes of 80 mm depth by 60 mm width and 4 mm thickness, giving a depth to the composite rib structure of 240 mm. Appropriate dimensions for the kingpost and braces may be, in this example, 80 mm by 60 mm.

Such a composite rib may be fabricated using a precision jig. In general for these sandwich-like designs composed of two tubes separated by spacers and bonded together into a single unit, the inertia (stiffness) of the composite assembly is much greater than the sum of the inertias (stiffnesses) of the individual components so that when the component pieces are forced against a precision former or jig and attached together, the stiffness of the over-all composite assembly will limit the "springback" or deformation when the composite assembly is released from the jig. Accordingly the composite assembly very closely retains the shape of the highly accurate jig or former. The composite rib is another example of high inertia ratio design in that errors in the rolling process can by corrected by the inertia ratio.

The composite rib embodiment has the advantage that deeper ribs and therefore much stronger ribs can be formed by this sandwich technique. Rolling machines are limited in the maximum depth of the sections that they can roll, but by combining two rolled sections with spacers, a composite section of three times the depth limit can be generated. Furthermore for strength-to-weight optimization, spacers having a depth other than the upper and lower tube depth may be used. Typically deep ribs like this are used at the ends of large troughs due to the concentration of forces and torques there, but may be advantageously light for use as mid-ribs.

Press forming of curved tubes against a precise jig may also be contemplated. The shape of the jig is preferably precisely controlled as the tube will spring-back to some extent when released from the press, and compensation may be built in to compensate for this phenomenon. This method can form the curved tubes in one pass, yet it is inflexible and if tubes with slightly varying parameters are obtained from different manufacturers, the press jig may have to be modified.

By some combination of these techniques, rib surface profile accuracies better than ±1 mm may be achieved, which in turn leads to trough parabolic surfaces that that can capture and focus energy on a receiver with inherent efficiency of the reflection approaching 100%.

Preparation of Panels

Figure 8:
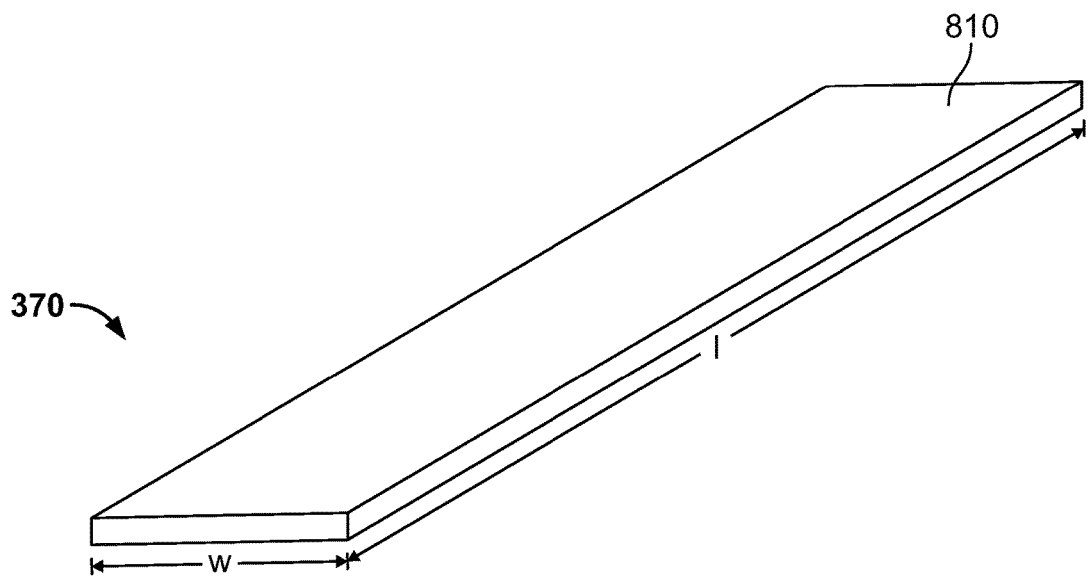
FIG. 8 is a schematic perspective view of a panel in accordance with an embodiment of the invention.

Reflective panels may be joined to the ribs to form the reflecting trough. In general these may by advantageously formed by coating a substrate (e.g., sheet metal) on one side with a highly efficient and durable film, for instance 3M® Specular Film—Protected manufactured by 3M Company, St Paul, Minn, or ReflecTech®Plus Mirror Film manufactured by ReflecTech, Inc, Arvad, Colo. In accordance with an embodiment of the invention, panels for formation of the trough surface are provided. Referring to FIG. 8, for a trough of for example 12 meter length each panel 370 may have a length l of 12 m. These panels may be uncoiled, flattened, and sheared from a standard roll, for instance of width w of 4 ft (1.22 m) wide. The roll of material may be galvanized sheet steel, e.g., 16 to 18 ga, available from Cohen Steel, Concord, N.H. Six of these sheet panels may be covered on the upper surface 810 with the mirror film. Placed long edge to long edge and secured against the offset parabolic top surface of the end ribs and inner ribs, six of these panels, with a width of 7.32 meters, may be curved into a parabolic cylindrical reflecting surface 12 m long and 6.46 m in projected aperture.

It is highly desirable that the panels be joined continuously along their abutting edges to create a continuous or monolithic shell for three reasons. Joining the edges improves the accuracy of the trough surface at points between the ribs. Secondly, useful longitudinal stiffening, i.e., stiffening perpendicular to the transverse direction of the ribs, for the panels and the trough itself may be thereby generated. Thirdly, the means employed to join the panels can usefully be also used to affix the panels to the ribs.

Figure 9A:
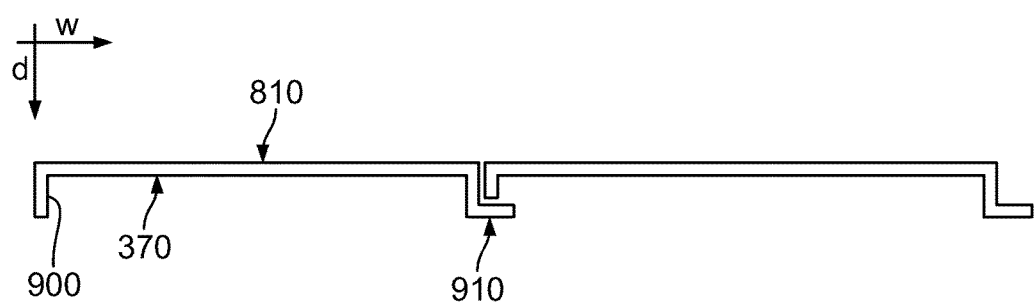
FIGS. 9A and 9B are schematic side views of flanges and bends and of U-channel strips used to fasten panels together, in accordance with embodiments of the invention.

Referring to FIG. 9A, in an embodiment flanges or bends are formed along the edges of the panels, either as the panel 370 is being unrolled or after the panel has been cut to length. This embodiment depicts a flange 900 formed on one edge of the panel and a z-bend 910 formed along the other edge. The z-bend and the flange therefore protrude on the backside of the panel, leaving the front reflective surface 810 of the panel free from obstruction. When two panels are joined, the outer edge of the flange is affixed to the outer edge of the z-bend in such a manner as to hold the panels securely together. The flange depth is preferably less than the depth of the z-bend for the two panels to mate securely. Some combination of structural adhesives, bolts, rivets, welding, or other metal joining techniques may be used to join z-bend and flange. An exemplary design might have a z-bend of 67 mm deep and 51 mm wide, with a flange of 42 mm wide. It can be seen that the panel joint possesses both depth (d) in the direction normal to the panel and width (w) in the direction parallel to the panel.

Joining panels in this way by some combination of z-bends and flanges has the advantage that no additional structural pieces are required to join the panels, although there is the disadvantage that the reflecting area of each panel is reduced by the amount of material incorporated into the z-bends and flanges. In the exemplary design a panel of width 1.22 m might be reduced to a usable width of 1.07 m, including allowance for bend radii.

Figure 9B:
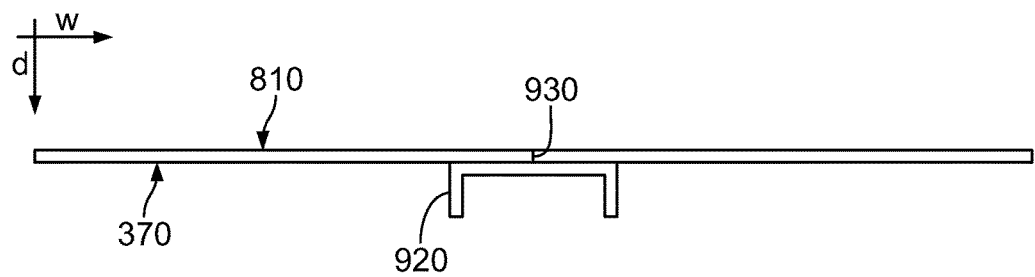

In alternate embodiment as shown in FIG. 9B, a U-shaped channel 920 may be affixed along the abutting edges (e.g., seam) 930 both to join the panels together and to provide longitudinal stiffness. An exemplary design might have a width (w) of 100 mm and a depth (d) of 80 mm, having a metal thickness equivalent to that of the panel itself. The alternate embodiment uses an additional piece of structural material with respect to the first embodiment, but the full 1.22 m surface of each reflecting panel is now available. Other designs to join the panels on the backside may be readily conceived, such as adding flanges to the U-channels, using hollow rectangular tubes instead of a U-channel, etc. In the limit the U-channel may be reduced to a simple joining strip.

A six panel exemplary design includes five panel joints. It is possible to join panels together before they are assembled into the trough, as depicted in FIGS. 9A and 9B. Alternatively they may be joined after being curved against the ribs. Although the panels are now curved and the U-channel is flat, the curvature is small enough over the width of the U-channel that that the U-channel will continue to make good contact with panels. Alternatively pairs of panels could be joined before being curved, and these three pairs may be joined after being curved.

In a properly executed design, the six joined panels will act mechanically as one continuous shell or sheet. Since the panels become curved when attached to the ribs, the result is to generate a thin shell with the depth of the parabola itself. This thin shell, with added strengthening of the two outer edges, is inherently relatively strong because of the considerable depth of the parabola itself.

Assembly of Trough

A reflector for solar concentration may include a reflective assembly including a plurality of elongate panels forming a continuous trough and a frame configured to support the panels. In an embodiment, the frame may include a plurality of spaced supports, e.g., trusses with each truss including at least one rib having a surface defining an offset parabola. Further, the embodiment may include a set of precision ribs, i.e., five inner ribs and two end ribs, and six reflective panels as the major components to be assembled to form the frame. The inner ribs may each include a single upper tube disposed on a kingpost and two braces. The end rib may be stronger, and may include a sandwich structure of two tubes with spacers disposed there between, and also incorporating a kingpost and two braces.

Figure 10:
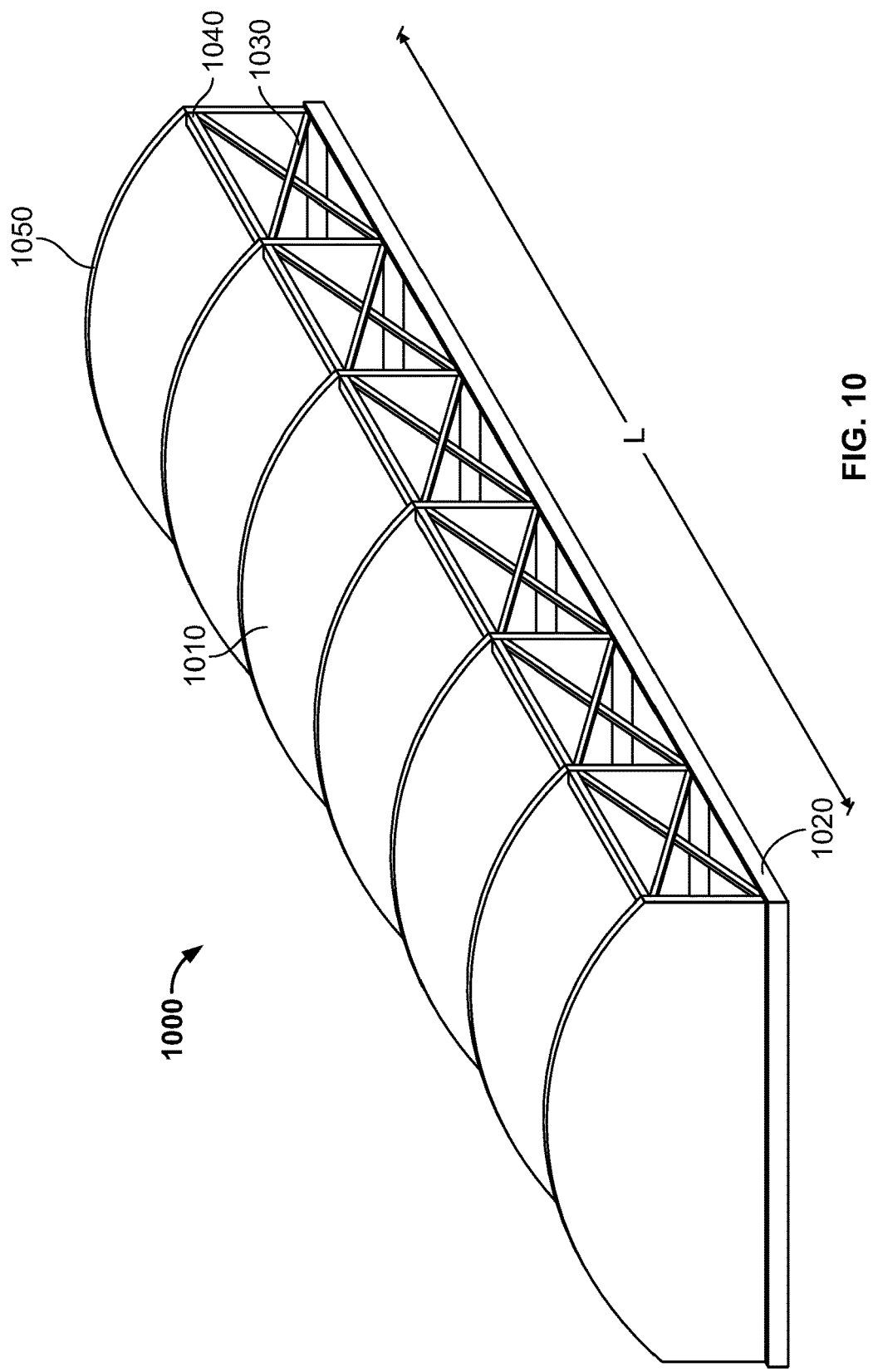
FIG. 10 is a schematic side view of a trough assembly fixture in accordance with an embodiment of the invention.

Referring to FIG. 10, the trough may be assembled upside down, against an assembly jig or fixture 1000, analogous to traditional boat-building techniques. A trough assembly former 1010 provides precise parabolic surfaces 1050 at the locations where the seven ribs will be located. Typically the parabolic top surface 1050 of the formers can be manufactured using precision techniques such as water jet cutting or numerically controlled machining as the assembly fixture is reused many times to build a large set of troughs. An exemplary implementation is to build seven formers 1010 and attach them in a precise and stable manner to a fixture base 1020. The formers are spaced 2 m apart, so that the over-all length (L) of the assembly jig is 12 m. Cross bracing 1030 and horizontal bracing 1040 are employed to maintain careful alignment of the entire structure. A plurality of cross-braces 1030 may be disposed in assembly jig 1000 (e.g., one or more sets of cross-braces may be disposed within each former 1010, or cross-braces may be disposed within some formers 1010 but not other formers 1010).

In a typical embodiment, pairs of two flat panels may be pre-joined along their long edges to produce three panel pairs. Because of the large bonding area, structural adhesive may be the preferred bonding method, but other mechanical joining techniques such as bolting or riveting may be employed to join the panels. These pairs are then placed reflecting surface down against the formers of the assembly fixture. The first panel pair might be placed along the right edge of the fixture, the second panel pair placed along the left edge of the fixture, and the third panel pair in the center. It is at this stage that the panels begin to take up the curvature of the formers, as the panels have little strength in the transverse direction. The three panel-pairs are then joined against their two abutting edges, so that all six panels are thereby joined. Alternatively all six panels can be pre-joined, or all panel joining operations done as the six individual panels are placed in the trough assembly fixture. In effect, the panels become one monolithic panel of, e.g., 12 m in length. The arc width is the full 24 feet if the panels are joined by U-channels; it is somewhat less if the panel width has been reduced by having flanges or z-bends rolled into it.

Next the ribs are placed over the panels at the locations where the formers are. Before placement the ribs may be coated with an adhesive or adhesive may be placed on the backside of the panels where the ribs will attach. At this stage the six panels are held between the formers underneath them and the ribs above them, forcing the previously flat panels into a shape with a precise parabolic top surface. Relatively quick setting adhesives compatible with galvanized materials, for instance Loctite® H8600® Speedbonder® (Henkel Corporation), are the preferred bonding approach due to low cost.

Since the ribs are placed on the backside of the trough's reflective surface, they do not cause shadowing or blockage on the front-side, leading to high optical efficiency.

On the trough backside mechanical interference between the ribs and the longitudinal z-bends/flanges or U-channels is preferably avoided. Either the ribs can be pre-notched for the z-bends/flanges or channels to cross and the strength of the ribs restored by applying plates around the notches or the z-bend/flanges or channels may be cut out and removed where the rib crosses. The second alternative may be preferable because the transverse ribs are the more major structural components than the longitudinal parts. In either case it is essential to connect the panels to the ribs via the panel backside structure. Brackets may be used over the ribs to restore the strength of the interrupted flanges or channels, and to also attach them to the ribs they cross to create a monolithic structure. The bracket is designed to cross over the rib and attach to the two z-bend/flanges or stringers on either side of the rib and to the rib itself.

Figure 11A:
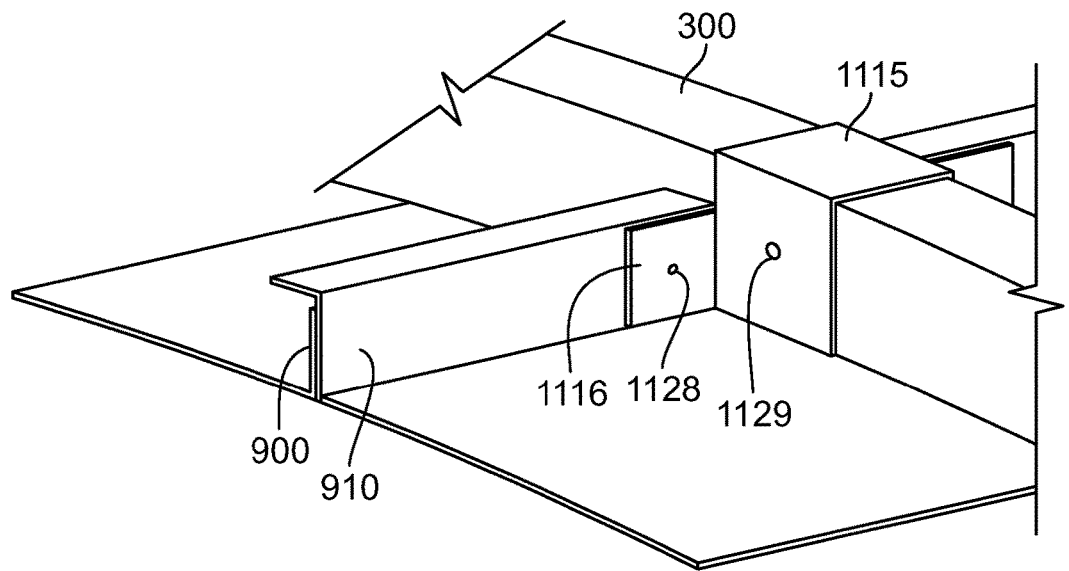
FIG. 11A is an isometric view of panel backside z-bends/flanges connected to a rib and FIG. 11B is an isometric view of panel backside U-channels connected to a rib.

For a rib that has a width of 40 mm and for rib spacing of 2 m, in an exemplary design as depicted in FIG. 11A, the z-bend/flanges are notched with 40 mm wide cuts every 2 m so that the 40 mm wide rib 300 can fit in the cut with the panel bottom in contact with the rib top. With ribs spaced every 2 m, the uninterrupted length of the z-bend/flange is 1.96 m. A bracket 1115 with tabs 1116 is placed over the rib itself and may be attached by the tabs to the z-bend/flanges on the two sides of the rib. The bracket may be bolted to the rib, preferably along the rib neutral axis, using hole 1129, and further bolted through the z-bend/flange combination using hole 1128. Structural adhesive may be used to supplement the bolts or to provide the sole means of structural joining.

Figure 11B:
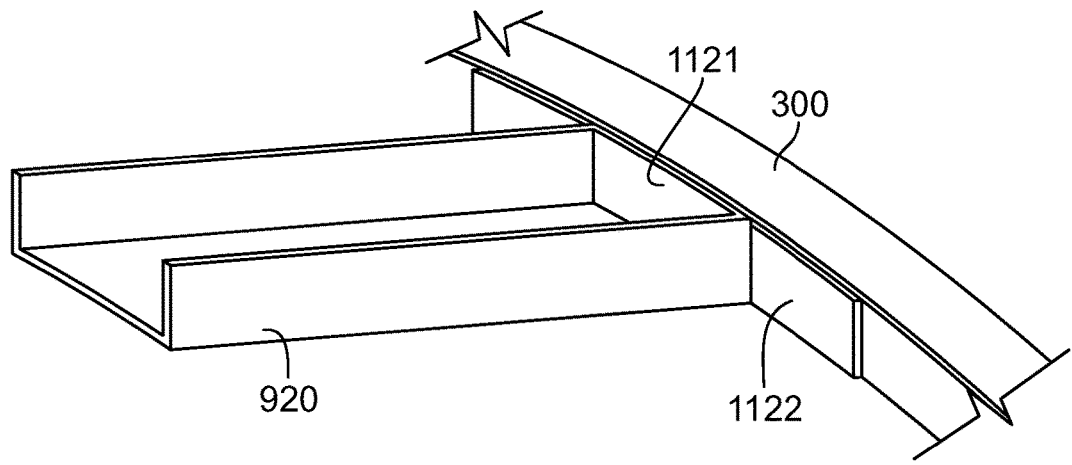

In an alternate exemplary design employing U-channels to join the panels, the bottom of the U-channel 920 may be extended by a length approximately equal to a height of a rib, e.g., 80 mm and bent up to form a tab 1121 for contacting an 80 mm rib 300 as depicted in FIG. 11B. This tab 1121 is then affixed to the side of the rib. Moreover, the sides of the U-channel may be further extended by the same length as the length of the bottom of the U-channel, by 80 mm for example, and bent out as tabs 1122 to contact the side of the rib to generate further attachment area. Holes can of course be provided in the tabs to bolt them through the rib. Furthermore, the tab 1121 could be further extended so that it could be bent over the bottom of the rib to provide even more attachment area.

The attachment of the panels to the ribs with brackets or otherwise is preferentially done using structural adhesives, supplemented if necessary by other standard joining methods such as bolting or riveting. It is to be noted that all fastening and affixing operations are done on the backside of the trough so that the front reflecting surface is not impacted at all.

As two final steps in the assembly of the trough, stiffening tubes may be affixed along the two outer edges of the parabolic cylinder and to the two outer edges of the panels, and the ribs may be cross-braced in some fashion.

Figure 12:
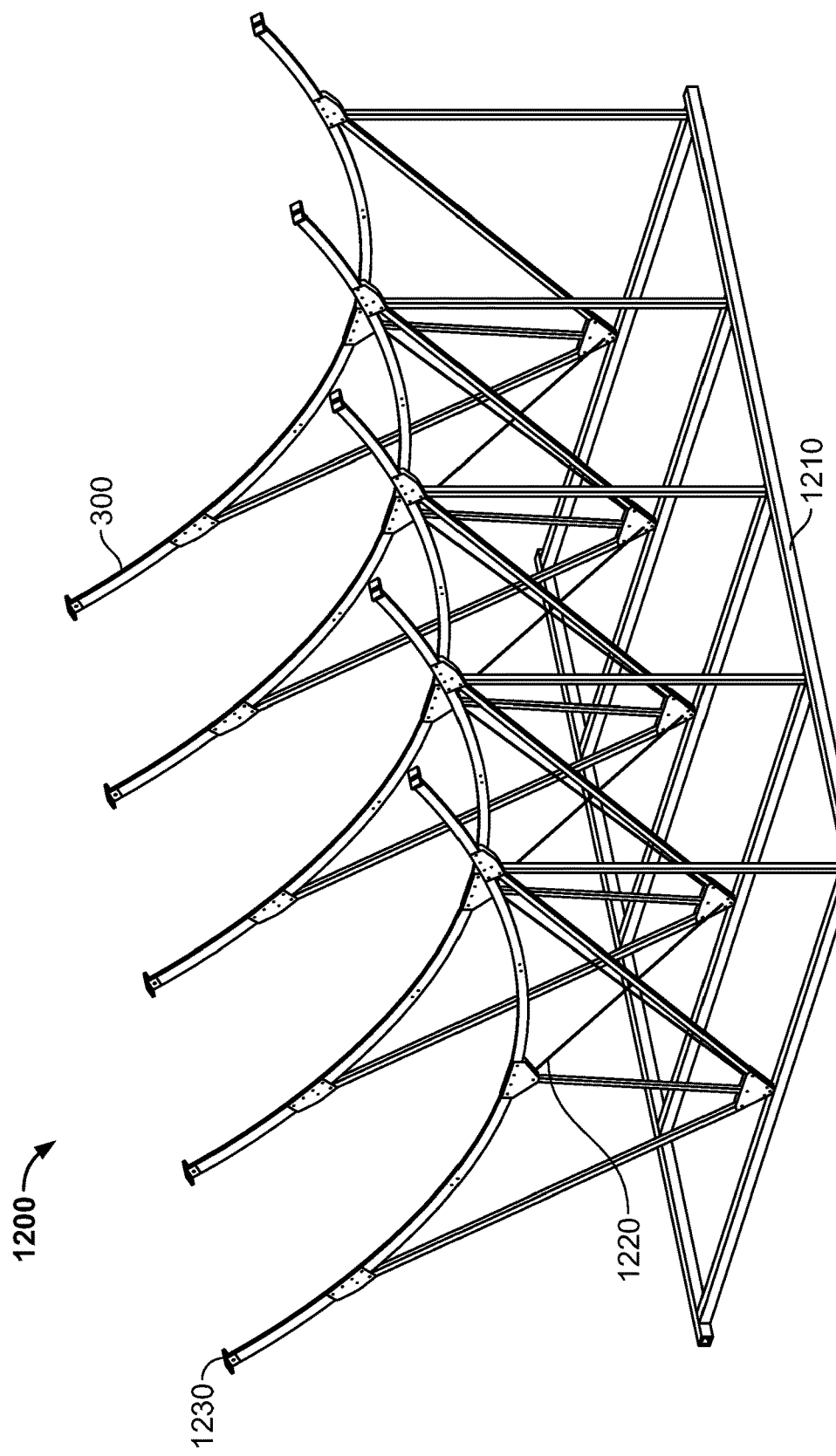
FIG. 12 is a schematic side view of a trough assembly fixture in accordance with an embodiment of the invention.

An alternate assembly technique is depicted in FIG. 12. In this assembly technique the trough can be assembled upright in place using the ribs themselves to form a temporary assembly fixture 1200 (e.g., a trough assembly jig). The two trough end supports (not shown) are put in place, and the end ribs (see ribs 300a in FIG. 13) are placed and secured on the rotational axles of these supports. Then the five inner ribs 300 are set in place on an alignment base 1210 (e.g., assembly jig base) that holds them upright in alignment with the two end ribs. The rib cross-bracing 1220 may be applied at this stage in the process. Next the panel pairs are set in place, starting with the panel pair at the center of the trough and then adding the two panel pairs to the other side. As the panel pairs are set in place, reflecting surface upright, structural adhesive is applied to their backside where they will contact and attach to the ribs. To ensure proper curvature and good adhesion, some kind of weight or force is applied to the front side of the panels above the line of the ribs. The weighting material of course may have a compliant and smooth surface to not damage or scratch the film surface. The panel pair is attached to the rib as previously described.

Figure 13:
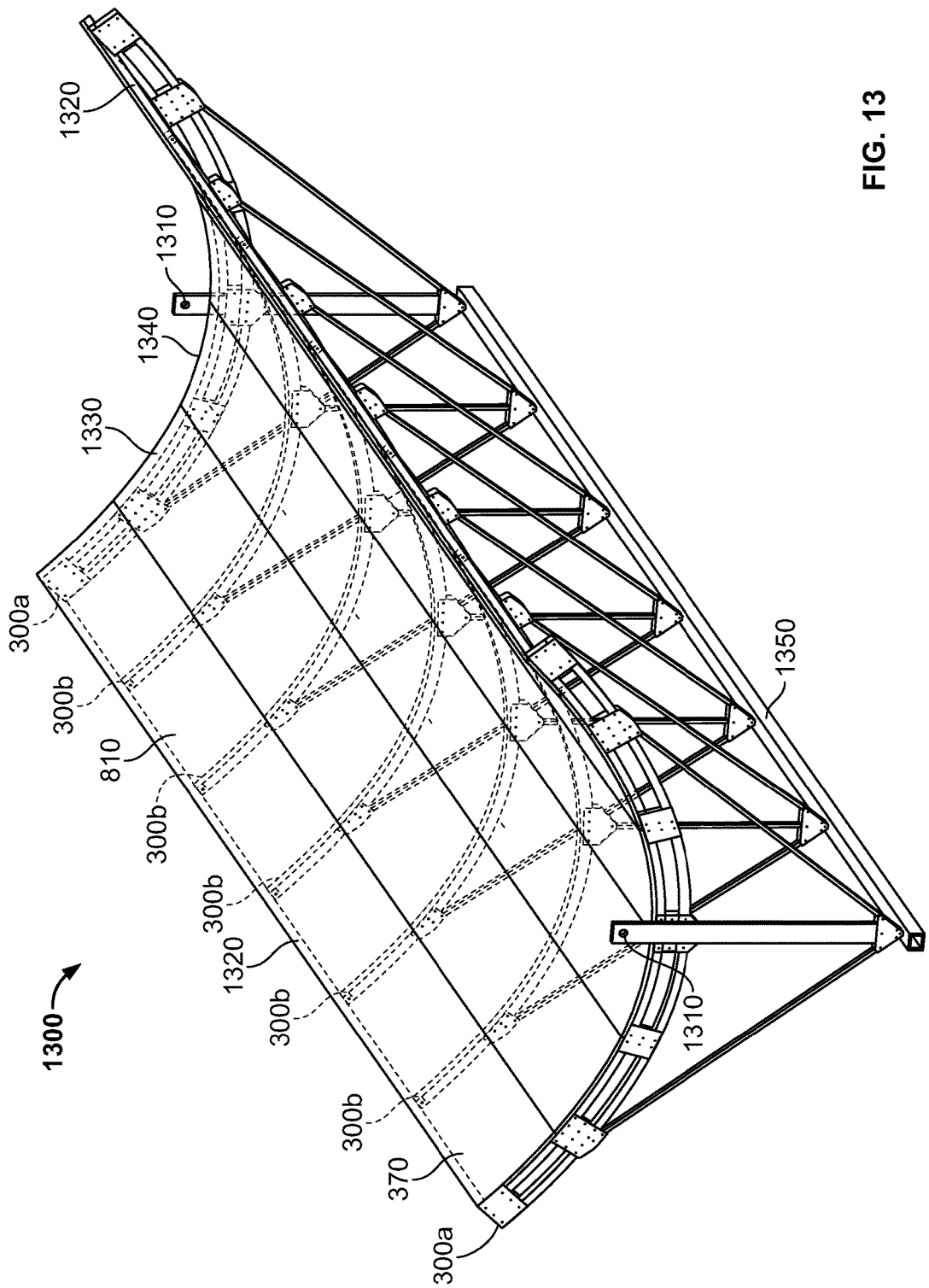
FIG. 13 is a schematic perspective view of a parabolic trough formed in accordance with an embodiment of the invention.

As the second and third panel pairs are set in place, structural adhesive is applied, both where the panel contacts the rib and where the panel pair joins the adjacent panel pair. Weighting is again employed to force the panel pairs against the upper surface of the ribs. Rivets and bolts may be added as necessary to join the panel pairs, and these panel pairs are attached to the rib via one of the methods previously described. As the final major step in the trough assembly, stiffening tubes 1320 (e.g., stiffening beams) may be affixed along the two outer edges of the parabola to the two outer edges of the panels, as shown in FIG. 13. In some embodiments, the bottom portions of the ribs 300*a* and 300*b* may be coupled to a stringer beam 1350, which may strengthen the structure of reflector 1300. Although the cross-bracing 1220 is not shown in FIG. 13, the ribs 300 of reflector 1300 may be cross-braced in some embodiments (e.g., in the manner illustrated in FIG. 12).

Alternatively panels may be attached one by one instead of being attached in pairs.

Once any structural adhesive has cured to sufficient strength, the alignment base under the ribs is removed. The result is a trough built in place, on its rotational axles, ready for the final steps.

The result of the rib and panel assembly is a monolithic shell gaining its strength from its depth and the depth of the ribs. No extensive backside space frame is required, as the panels are employed not only to reflect sunlight, but to contribute to the structural strength of the trough. Expensive assembly techniques like welding or extensive bolting are not necessary, and galvanized materials may be used. Panels do not have to pre-curved, as they take their shape from being forced and secured against the precision offset parabola of the curvature of the ribs. The accuracy of the rib upper surface is therefore the determining factor in the ultimate accuracy and thereby efficiency of the trough.

The depth of the trough comprises the depth of the parabola and the depth of the truss on the backside generated by frame 1230 (e.g., the ribs and their cross-bracing). This depth and the fact that the entire structure acts as a unitary structure when properly joined and adhered leads to a stiff structure when subjected to gravity and wind loading. A trough built in this style does not possess large rotational stiffness and as a consequence actuators to rotate the trough may be attached to both ends of the trough. Consequently troughs are independent of one another, leading to easy siting on uneven terrain.

Trough Completion

To complete the trough for use in a field of solar collectors, if it was not built in place, the trough is preferably mounted on two supports incorporating axles 1310 so that the trough can be rotated about the axles in one dimension, as shown in FIG. 13. Then a receiver is mounted along the focal line of the trough. Since receivers typically are available in lengths of 4 m, the receiver design is compatible with ribs spaced every two meters, as a receiver support structure can be mounted to the end ribs and to every other inner rib. The final major task to complete the trough is to incorporate a means for trough rotation. As a consequence of the large torque that may be required in conditions of wind and of the very low rotation speed, nominally 15° per hour, implying low power, hydraulic systems are preferred. With these provisions completed, the trough can be connected to adjacent troughs so that the working fluid can flow through the field of troughs, and then the trough may be placed into operation under the control of a solar tracking system.

Referring to FIG. 13, the resulting reflector 1300 may include a reflective assembly 1340 with a trough structure 1330 formed of six panels 370 aligned and joined along their long edges and mechanically affixed to the seven precision backside ribs (e.g., end ribs 300*a* and inner ribs 300*b*), evenly disposed along the lengths of the panels, e.g., every 2 m. The panels, which form the reflective surface 810 of the trough, are curved and held into the requisite parabolic shape by the offset parabolic shape of the backside ribs 300. A preferred focal length of the parabola is 1.4-2.0 m, more preferably 1.7 m, corresponding to a radius of curvature at the center of 3.4 m. If the curvature of the trough is too great, panel area is not used efficiently, whereas if the curvature is too low, pointing errors are magnified at the edges of the trough and the trough is not deep enough to gain strength and stiffness.

The described embodiments of the invention are intended to be merely exemplary and numerous variations and modifications will be apparent to those skilled in the art. All numerical values and ranges are exemplary and not to be considered limiting. All such variations and modifications, including all combinations and permutations of materials, process steps, and values are intended to be within the scope of the present invention as defined in the appended claims.

What is claimed is:

1. A reflector for solar concentration, the reflector comprising:
   a reflective assembly comprising a plurality of elongate panels each comprising a sheet joined along abutting long edges thereof, forming a continuous trough; and
   a frame configured to support the panels, the frame comprising a plurality of spaced supports, wherein the frame with attached panels defines a parabolic contour on a top side of the trough,
   wherein the joining of the panels along the abutting long edges thereof imparts stiffening to the trough in a longitudinal direction of the trough perpendicular to a transverse direction of the supports, and
   wherein the long edges of the panels extend across the spaced supports in the longitudinal direction of the trough.

2. The reflector of claim 1, wherein the plurality of panels are joined using at least one of z-bends or flanges, attached to each other by at least one of adhering, bolting, and riveting.

3. The reflector of claim 1, wherein the plurality of panels are joined using a connecting strip or channel, attached to the panels by at least one of adhering, bolting, and riveting.

4. The reflector of claim 1, further comprising a connecting strip disposed across a seam defined by adjacent panels.

5. The reflector of claim 1, wherein the reflective assembly comprises at least three panels.

6. The reflector of claim 1, wherein at least one panel comprises a metal sheet.

7. The reflector of claim 1, wherein at least one panel comprises a film disposed on a substrate.

8. The reflector of claim 1, wherein at least one support comprises a truss.

9. The reflector of claim 8, wherein the truss comprises at least one rib having a surface defining an offset parabola.

10. The reflector of claim 9, wherein the at least one rib comprises a tube.

11. A method of manufacturing a solar reflector, the method comprising the steps of:
aligning a plurality of elongate panels each comprising a sheet over an arcuate surface;
joining the panels along abutting long edges thereof to form a continuous trough; and
affixing a frame to back sides of the panels, the frame comprising a plurality of spaced supports,
wherein the joining of the panels along the abutting long edges thereof imparts stiffening to the trough in a longitudinal direction of the trough perpendicular to a transverse direction of the supports, and
wherein the long edges of the panels extend across the spaced supports in the longitudinal direction of the trough.

12. The method of claim 11, wherein the plurality of panels comprises at least three panels.

13. The method of claim 11, wherein the arcuate surface defines a parabola.

14. The method of claim 11, wherein at least one support comprises a truss.

15. The method of claim 14, wherein the truss comprises at least one rib having an offset parabolic surface.

16. The method of claim 15, wherein the at least one rib comprises a tube.

17. The method of claim 11, further comprising:
interconnecting the plurality of panels with flanges.

18. The method of claim 11, further comprising:
interconnecting the plurality of panels by at least one of welding, brazing, bolting, riveting, and adhering.

19. The reflector of claim 1, wherein the long edges of abutting panels are joined using at least one of z-bends or flanges, and wherein the supports are joined to the z-bends or flanges by brackets.

20. The reflector of claim 1, wherein the long edges of abutting panels are joined using connecting strips or channels, and wherein the supports are affixed to the connecting strips or channels.

21. The method of claim 11, further comprising joining the long edges of abutting panels using at least one of z-bends or flanges.

22. The method of claim 21, further comprising joining the supports to the z-bends or flanges.

23. The method of claim 22, wherein the supports are joined to the z-bends or flanges by brackets.

24. The method of claim 11, further comprising joining the long edges of abutting panels using connecting strips or channels.

25. The method of claim 24, further comprising affixing the supports to the connecting strips or channels.

26. The method of claim 11, wherein the frame defines the arcuate surface.

\* \* \* \* \*